(12) United States Patent
Fuhrman

(10) Patent No.: US 10,297,247 B2
(45) Date of Patent: May 21, 2019

(54) PHONOTACTIC-BASED SPEECH RECOGNITION AND RE-SYNTHESIS

(71) Applicant: Malaspina Labs (Barbados), Inc., Vancouver (CA)

(72) Inventor: Robert Alex Fuhrman, Vancouver (CA)

(73) Assignee: MALASPINA LABS (BARBADOS), INC. (CA)

( * ) Notice: Subject to any disclaimer, the term of this patent is extended or adjusted under 35 U.S.C. 154(b) by 19 days.

(21) Appl. No.: 15/249,457

(22) Filed: Aug. 28, 2016

(65) Prior Publication Data

US 2017/0301347 A1    Oct. 19, 2017

Related U.S. Application Data

(60) Provisional application No. 62/322,163, filed on Apr. 13, 2016.

(51) Int. Cl.
| | |
|---|---|
| *G10L 15/02* | (2006.01) |
| *G10L 15/12* | (2006.01) |
| *G10L 15/16* | (2006.01) |
| *G10L 25/30* | (2013.01) |
| *G10L 15/06* | (2013.01) |

(Continued)

(52) U.S. Cl.
CPC ........... *G10L 15/063* (2013.01); *G10L 15/02* (2013.01); *G10L 15/16* (2013.01); *G10L 15/197* (2013.01); *G10L 15/20* (2013.01); *G10L 2015/025* (2013.01); *G10L 2015/0635* (2013.01)

(58) Field of Classification Search
None
See application file for complete search history.

(56) References Cited

U.S. PATENT DOCUMENTS

| | | | | |
|---|---|---|---|---|
| 5,457,770 A | * | 10/1995 | Miyazawa | ............ G10L 15/12 |
| | | | | 704/255 |
| 5,528,728 A | * | 6/1996 | Matsuura | ............... G10L 15/12 |
| | | | | 704/232 |

(Continued)

*Primary Examiner* — Marcus T Riley
(74) *Attorney, Agent, or Firm* — Fernando & Partners, LLP; Bejan Hafezzadeh

(57) ABSTRACT

Various implementations disclosed herein include a phonotactic post-processor configured to rescore the N-best phoneme candidates output by a primary ensemble phoneme neural network using a priori phonotactic information. In various implementations, one of the scored set of the N-best phoneme candidates is selected as a preferred estimate for a one-phoneme output decision by the phonotactic post-processor. In some implementations, the one-phoneme output decision is an estimate of the most likely detected and recognized phoneme in a frame based on a function of posterior probabilities generated by an ensemble phoneme neural network, as well as phonotactic information and statistical performance characterizations incorporated by the phonotactic post-processor. More specifically, in various implementations, a phonotactic post-processor as described herein utilizes a priori known patterns of phonotactic structure representative of higher-level linguistic structure, instead of configuring the system to learn to recognize the higher-level linguistic structure a posteriori.

19 Claims, 11 Drawing Sheets

(51) Int. Cl.
*G10L 15/20* (2006.01)
*G10L 15/197* (2013.01)

(56) References Cited

U.S. PATENT DOCUMENTS

| | | | | |
|---|---|---|---|---|
| 5,749,066 A * | 5/1998 | Nussbaum | ............ | G10L 15/063 704/232 |
| 5,787,393 A * | 7/1998 | Inazumi | ................ | G10L 15/16 704/232 |
| 5,867,816 A * | 2/1999 | Nussbaum | ............ | G10L 15/063 704/232 |
| 8,554,555 B2 * | 10/2013 | Gruhn | .................. | G10L 15/063 704/232 |
| 9,153,231 B1 * | 10/2015 | Salvador | ................ | G10L 15/065 |
| 2017/0301347 A1 * | 10/2017 | Fuhrman | ................ | G10L 15/20 |

* cited by examiner

FIG. 5

PHONOTACTIC-BASED SPEECH RECOGNITION AND RE-SYNTHESIS

TECHNICAL FIELD

The present disclosure relates to audible signal processing, and in particular, to accurately recognizing phonemes in noisy audible signal data using phonotactic information.

BACKGROUND

The ability to recognize speech of a speaker is a basic human auditory system function. However, this function is notoriously difficult to reproduce using previously known machine-listening technologies because spoken communication often occurs in adverse acoustic environments. The problem is also complicated because how a person speaks the same words often varies between different utterances. Nevertheless, the unimpaired human auditory system is able to recognize speech effectively and perceptually instantaneously.

As a previously known machine-listening process, speech recognition (and subsequent re-synthesis) often includes recognizing phonemes using statistical formalisms. Phonemes are a basic representation of information bearing vocalizations. However, the previously known approaches for detecting and recognizing phonemes have a number of drawbacks. First, for example, in order to improve performance, previously known neural network approaches are heavily dependent on language-specific models, which make such approaches language-dependent. Second, many of the previously known neural network approaches recognize phonemes too slowly for real-time and/or low-latency applications because they are reliant on look-ahead information in order to provide context. Third, previously known neural network approaches are becoming increasingly computationally complex, use ever-larger memory allocations, and yet remain functionally limited and highly inaccurate.

Due to increasing computational complexity and memory demands, previously known phoneme detection and recognition approaches are characterized by long delays and high power consumption. As such, these approaches are undesirable for low-power, real-time and/or low-latency devices, such as hearing aids and mobile devices (e.g., smartphones, wearable devices, etc.).

SUMMARY

Various implementations of systems, methods and devices within the scope of the appended claims each have several aspects, no single one of which is solely responsible for the attributes described herein. After considering this disclosure those of ordinary skill in the art will understand how the aspects of various implementations are used to enable phonotactic-knowledge based detection and recognition of phonemes within continuous large vocabulary speech sequences without using language specific models ("left-context"), look-ahead ("right-context") information, or multi-pass sequence processing, and while operating within the resource constraints of low-power and real-time devices. As used hereinafter, a phoneme class label includes a phoneme label and/or a class of phoneme labels.

In accordance with various implementations, a device provided to identify phonemes within audible signal data includes: an ensemble phoneme recognition neural network configured to assess which of a plurality of phonemes is present within audible signal data based on inputs including at least a first feature stream, and output N-best phoneme candidates for a respective analysis frame of the audible signal data, wherein each of the N-best phoneme candidates is characterized by a respective phoneme class label and a respective posterior probability; and a phonotactic post-processor configured to identify a one-phoneme output candidate of the N-best phoneme candidates output by the ensemble phoneme recognition neural network by rescoring the respective posterior probabilities characterizing the N-best phoneme candidates based on a rank-order decoding function.

In accordance with various implementations, a method provided to identify phonemes within audible signal data includes: generating, using an ensemble phoneme recognition neural network, N-best phoneme candidates for a respective analysis frame of the audible signal data, wherein the N-best phoneme candidates represent which of a plurality of phonemes is present within the audible signal data based on a first feature stream, wherein each of the N-best phoneme candidates is characterized by a respective phoneme class label and a respective posterior probability; and identify, using a phonotactic post-processor, a one-phoneme output candidate of the N-best phoneme candidates output by the ensemble phoneme recognition neural network by rescoring the respective posterior probabilities characterizing the N-best phoneme candidates based on rank-order decoding.

In various implementations, rank-order decoding includes generating a N-state machine based on the N-best phoneme candidates, wherein each of the N-best phoneme candidates defines a state of the N-state machine; determining a respective probability that a phoneme candidate is emitted by each of the prior N states in the N-state machine for a current time step; and selecting one of the respective probabilities that satisfies a threshold selection criterion for each one of the N-states for the current time step.

In various implementations, rank-order decoding also includes selecting one of the N-states satisfying a state selection criterion as a most likely state, representing a respective one of the N-best phoneme candidates, for the current time step; and generating a phoneme class label associated with the selected on of the N-states.

In various implementations, rank-order decoding also includes determining a respective feature score for each of the prior N states transitioning to one of the N-states in the current time step, and wherein determining the respective probability that a phoneme candidate is emitted by each of the prior N states in the N-state machine for the current time step is based on the respective feature score.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

FIG. 5 is an example of a representation of phone feature matrix in accordance with some implementations.

Figure 1:
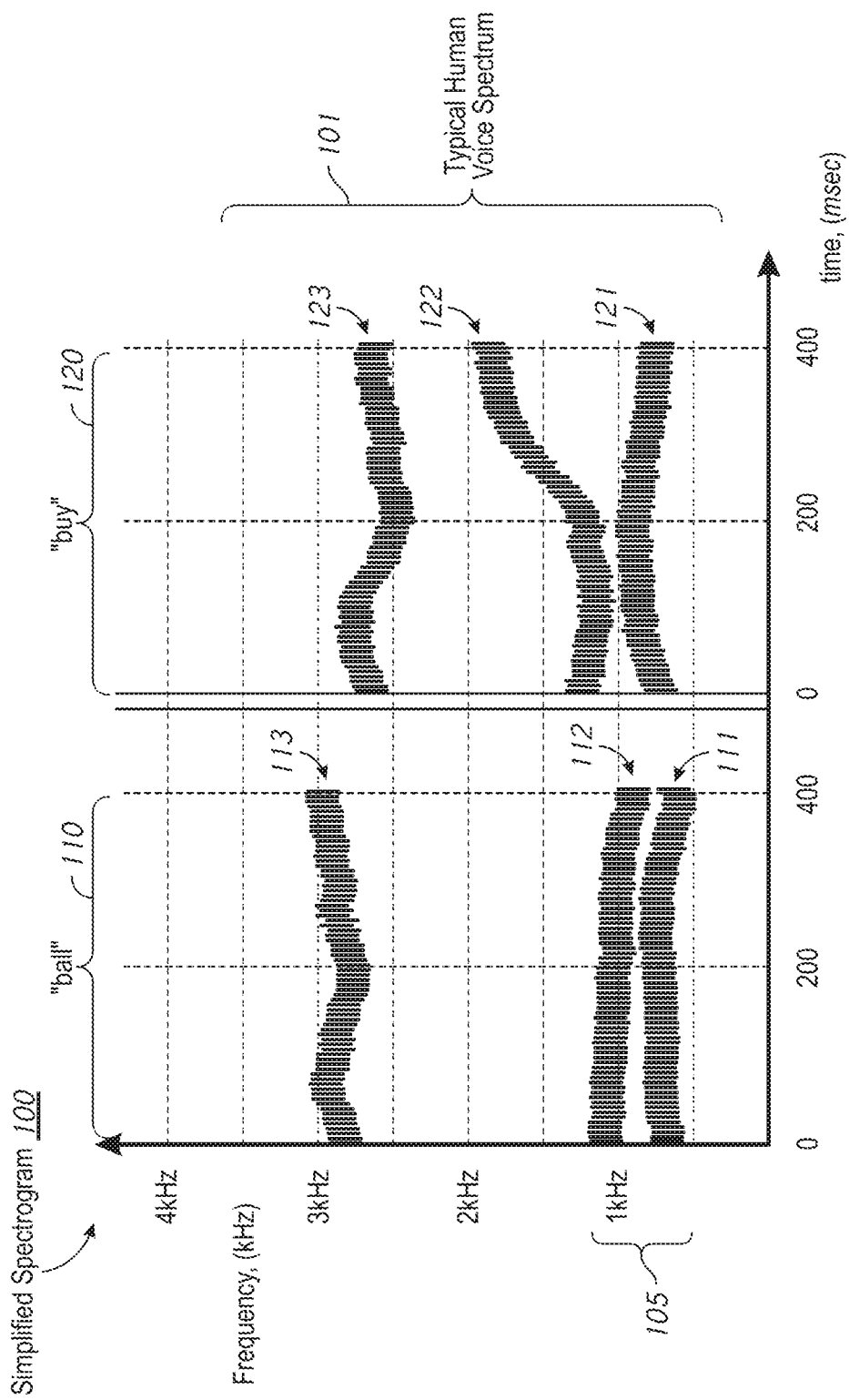
FIG. 1 is a simplified spectrogram of an example of vocalizations of two words having similar and potentially conflicting phonemes.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the drawings.

DETAILED DESCRIPTION

Numerous details are described herein in order to provide a thorough understanding of the example implementations illustrated in the accompanying drawings. However, the invention may be practiced without many of the specific details. Those of ordinary skill in the art will appreciate from the present disclosure that well-known methods, components, systems and circuits have not been described in exhaustive detail so as not to unnecessarily obscure more pertinent aspects of the implementations described herein.

As noted above, accurate speech recognition is a notoriously difficult hearing task to reproduce using previously known machine-listening technologies. The challenge is complicated because spoken communication often occurs in adverse acoustic environments, which often include ambient noise, interfering sounds, and background chatter. The problem is also complicated because how a person speaks the same words often varies between different utterances of the words. Additionally, different people typically speak the same words with different accents and tempos, which further complicates the challenges for speech recognition systems. However, it is well established that speech recognition accuracy is highly dependent on phoneme recognition and discrimination accuracy, which varies greatly depending on the specific phonemes. For example, distinguishing the spoken word "first" from the spoken word "third" depends upon being able to distinguish an 'f' sound from a 'th' sound, and a 't' sound from a 'd' sound. But making such distinctions reliably using previously available machine-listening technologies is very difficult to accomplish.

As an example provided to illustrate the spectral challenges involved in distinguishing similar sounding phonemes, FIG. 1 is a simplified spectrogram 100 showing example formant sets 110, 120 associated with two words, namely, "ball" and "buy". Those of ordinary skill in the art will appreciate that the simplified spectrogram 100 includes merely the basic information typically available in a spectrogram. So while some specific features are illustrated, those of ordinary skill in the art will appreciate from the present disclosure that various features have not been illustrated for the sake of brevity and so as not to obscure more pertinent aspects of the spectrogram 100. Nevertheless, those of ordinary skill in the art would appreciate that the spectrogram 100 does include enough information to illustrate the pertinent differences between the two sets of formants 110, 120.

The spectrogram 100 includes the portion of the frequency spectrum associated with human vocalizations, the human voice spectrum 101. The human voice spectrum typically ranges from approximately 300 Hz to 3130 Hz. However, the bandwidth associated with a typical voice channel is approximately 4000 Hz (4 kHz) for telephone applications and 8000 Hz (8 kHz) for hearing aid applications.

Formants are distinguishing frequency components of voiced sounds that make up phonemes. A phoneme, of any language, includes a combination of formants in the human voice spectrum 101. In addition to characteristics such as pitch and amplitude (i.e., loudness), formants and how formants vary in time characterize how words are perceived to sound. Formants do not vary significantly in response to changes in pitch. However, formants do vary substantially in response to different vowel sounds. An example of the variation can be seen with reference to the formant sets 110, 120 for the words "ball" and "buy." The first formant set 110 for the word "ball" includes three dominant formants 111, 112 and 113. Similarly, the second formant set 120 for the word "buy" also includes three dominant formants 121, 122 and 123. The three dominant formants 111, 112 and 113 associated with the word "ball" are spaced differently and vary differently in time as compared to the three dominant formants 121, 122 and 123 associated with the word "buy." Also, if the formant sets 110 and 120 are attributable to different speakers, the formants sets would not be synchronized to the same fundamental frequency defining the pitch of one of the speakers.

As a previously known machine-listening process, speech recognition (and subsequent re-synthesis) typically includes phoneme recognition using neural networks, as phonemes are a constituent component of information bearing vocalizations that are perceived as spoken words. However, previously known neural network approaches have a number of drawbacks that make them undesirable for low-power, real-time and/or low-latency devices, such as hearing aids and mobile devices (e.g., smartphones, wearable devices, etc.).

First, previously known neural network approaches are heavily dependent on language specific models. Language specific models include distributions of conditional probability values characterizing the likelihoods of which phonemes follow other phonemes on a phoneme-by-phoneme basis. In other words, these models provide sequence information (or "left-context") to assist in the recognition of a phoneme at a given instance based on a decision recognizing a previous phoneme in sequence. While beneficial for improving recognition accuracy, relying on sequence information makes such approaches language-dependent. In turn, a speech recognition system relying on sequence information is limited to the number of language models that can be supported by the computational and memory resources of a given system. Generally, this is undesirable for devices, such as low power battery operated devices (e.g., hearing aids and mobile devices), which are tightly resource constrained.

Second, many of the previously known neural network approaches process audible sequences far too slowly for real-time and/or low-latency applications because they are also reliant look-ahead information and multi-pass sequence processing. Look-ahead systems, or "right-context" information systems, delay the recognition of a phoneme until the system is able to evaluate which of one or more phonemes follow in sequence. Delaying phoneme recognition in this manner precludes real-time and/or low-latency operation because phoneme recognition depends on future phonemes.

Third, in order to improve recognition accuracy, previously known neural network approaches are becoming increasingly computationally complex, are demanding ever larger memory allocations, and yet remain functionally limited and highly inaccurate—especially for problematic phonemes that are difficult to detect and are frequently misidentified as other similar sounding phonemes. For example, some previously known neural network approaches employ a structured neural network architecture that is configured toward recognizing different individual phonemes. What these approaches have in common is that they merely rely on low-level linguistic information present in an audio signal as inputs, and force the structured neural network to learn to recognize the higher order attributes of speech (e.g., auditory filters that emulate the response of the basilar membrane in the human ear) that focus on identifying sound energies in different frequency bands, combinations of different auditory filter energies, the evolution of filter responses over time, combining these features to track "high energy" plosive sounds versus "harmonic" vowel sounds a-posteriori. Relying on a neural network to learn to recognize higher order attributes of speech from audible signal data significantly increases the size and complexity of the neural network required. For example, a previously available recurrent neural network (RNN) with the capacity to learn to recognize higher order attributes of speech typically includes nine to ten hidden layers in addition to the input and output layers that define the RNN. A RNN of that size typically includes inputs sizes of the order of $10^3$, a number of neurons (neural network logic units) of the order of $10^4$, interconnects (between the logic units) of the order of $10^6$, and noisy speech training data of the order of $10^4$ hours. As noted above, despite this immense computational complexity and demand for memory, these approaches remain functionally limited especially for problematic phonemes.

By contrast, various implementations disclosed herein include a phonotactic post-processor configured to rescore (e.g., evaluate and potentially reorder) the N-best phoneme candidates output by a primary ensemble phoneme neural network using a priori phonotactic information. In various implementations, one of the scored set of the N-best phoneme candidates is selected as a preferred estimate for a one-phoneme output decision by the phonotactic post-processor. In some implementations, the one-phoneme output decision is an estimate of the most likely detected and recognized phoneme in a frame based on a function of posterior probabilities generated by ensemble phoneme neural network 310, as well as phonotactic information and statistical performance characterizations incorporated by the phonotactic post-processor 410.

More specifically, in various implementations, a phonotactic post-processor as described herein utilizes a priori known patterns of phonotactic structure representative of higher-level linguistic structure, instead of configuring the system to learn to recognize the higher-level linguistic structure a-posteriori (as is done for previously available machine-listening technologies). Phonotactic structure characterizes attributes of the phoneme sounds caused by the human vocal anatomy, such as whether the lips are open or closed (e.g., 'p' vs. 't'), whether the tongue tip is between the teeth or further back in the mouth (e.g., 'th' vs. 'f'), or whether air is being passed through the lips (e.g., 'k' vs. 'ng'). Similar sounding phonemes are difficult to detect and are frequently misidentified by previously known neural network approaches attempting to discriminate between similar sounding phonemes using low-level linguistic information. In various implementations, a phonotactic post-processor utilizes phonotactic structural attributes for a similar purpose as previously known phoneme bi-gram systems (e.g., by using probability distributions to help classify the present phoneme based on what phonemes preceded it). However, unlike previously known phoneme bi-gram systems, implementations described herein use phonotactic bi-gram information in a language independent manner, so that reliance on language models can be significantly reduced or eliminated. For example, if a phoneme is pronounced by having lips closed, it is highly probable that the following phoneme will be pronounced by having the lips open. Examples of this type of phonotactic structural attributes tend to be common across all languages because they are dependent on how sounds can actually be and/or are physically pronounced in sequence by the human vocalization system irrespective of the language. Phonotactic structural attributes are not specific to any one particular language and are beneficial in discriminating between similar sounding phonemes.

Figure 2:
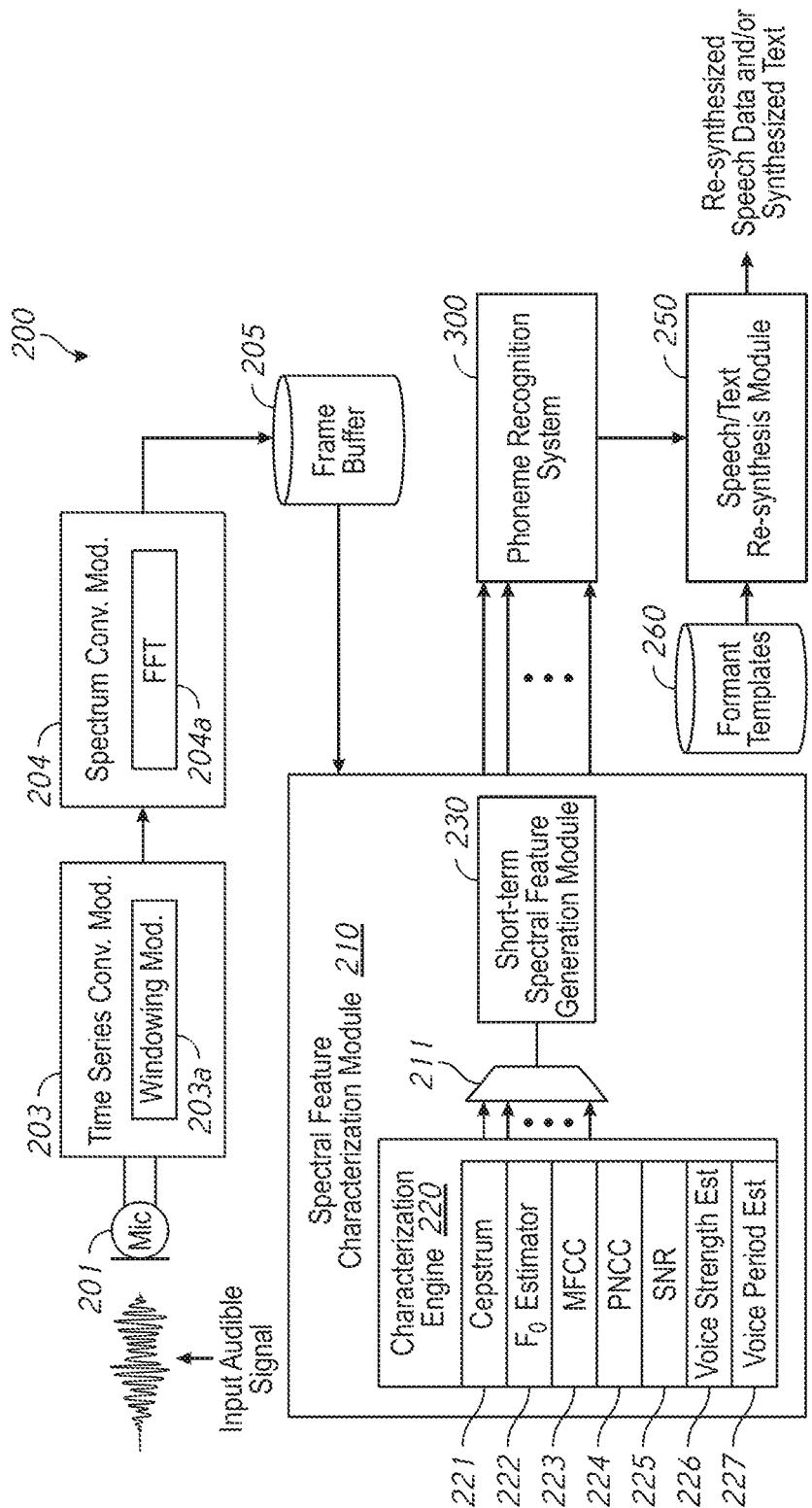
FIG. 2 is a block diagram of a speech recognition and re-synthesis system incorporating a phoneme recognition system in accordance with some implementations.

FIG. 2 is a block diagram of a speech recognition and re-synthesis system 200 incorporating a phoneme recognition system 300 in accordance with some implementations. In various implementations, the speech recognition and re-synthesis system 200 or portions thereof are included in a device or system enabled with one or more machine-listening applications, such as a computer, a laptop computer, a tablet device, a mobile phone, a smartphone, a wearable (e.g., a smart watch), a gaming device, and a hearing aid. While pertinent features are illustrated, those of ordinary skill in the art will appreciate from the present disclosure that various other features have not been illustrated for the sake of brevity and so as not to obscure more pertinent aspects of the implementations disclosed herein. Those of ordinary skill in the art will also appreciate from the present disclosure that the functions of the modules described below can be combined into one or more modules and/or further sub-divided into additional sub-modules; and, that the modules described below are provided as merely one example configuration of the various aspects and functions described herein.

As a non-limiting example, in some implementations, the speech recognition and re-synthesis system 200 includes a microphone 201, a time series conversion module 203, a spectrum conversion module 204, a frame buffer 205, a spectral feature characterization module 210, the aforementioned phoneme recognition system 300, a speech (or text) re-synthesis module 250, and a formant templates buffer 260.

The microphone 201 (e.g., one or more audio sensors) is provided to receive and convert sound into electronic signal data that can be stored in a non-transitory memory, and which is referred to as audible signal data hereinafter. In many situations, audible signal data is captured from within an adverse acoustic environment, and thus likely includes ambient noise, interfering sounds, and background chatter in addition to a target voice of interest.

In many applications, the microphone 201 provides the audible signal data as an ongoing or continuous time series of values. In turn, the times series conversion module 203 is configured to generate two or more temporal frames of audible signal data from a continuous stream of audible signal data. Each temporal frame of audible signal data includes a temporal portion of the audible signal received by the microphone 201. In some implementations, the times series conversion module 203 includes a windowing module 203a that is configured to mark and separate one or more temporal frames or portions of the audible signal data for times $t_1, t_2, \ldots, t_n$. In some implementations, each temporal frame of the audible signal data is conditioned by a pre-filter (not shown). For example, in some implementations, pre-filtering includes band-pass filtering to isolate and/or emphasize the portion of the frequency spectrum typically associated with human speech. In some implementations, pre-filtering includes pre-emphasizing portions of one or more temporal frames of the audible signal data in order to adjust the spectral composition of the one or more temporal frames of the audible signal data. Additionally and/or alternatively, in some implementations, the windowing module 203a is configured to retrieve the audible signal data from a non-transitory memory. Additionally and/or alternatively, in some implementations, pre-filtering includes filtering the received audible signal using a low-noise amplifier (LNA) in order to substantially set a noise floor for further processing. In some implementations, a pre-filtering LNA is arranged between the microphone 201 and the time series conversion module 203. Those of ordinary skill in the art will appreciate that numerous other pre-filtering techniques may be applied to the received audible signal, and those highlighted herein are merely examples of numerous pre-filtering options available.

The spectrum conversion module 204 operates to generate a corresponding frequency domain representation for each of the one or more temporal frames, so that one or more spectral characteristics of the audible signal data can be determined for each frame. In some implementations, the frequency domain representation of a temporal frame includes at least one of a plurality of sub-bands contiguously distributed throughout the frequency spectrum associated with voiced sounds. In some implementations, for example, the spectrum conversion module 204 includes a Fast Fourier Transform (FFT) sub-module 204a. In some implementations, a 32 point short-time FFT is used for conversion into the frequency domain. Those of ordinary skill in the art will appreciate that any number of FFT implementations are used in various implementations. In various implementations, the FFT module 204a may also be replaced with a Goertzel module. Additionally and/or alternatively, the FFT module 204a may also be replaced with any suitable implementation of a wavelet decomposition module, constant-Q transform and/or a set of redundant basis function modules configured to capture pertinent spectral characteristics of the input signal. In some implementations, an optional spectral filter module (not shown) is configured to receive and adjust the spectral composition of the frequency domain representations of the one or more frames. In some implementations, for example, the spectral filter module is configured to one of emphasize, deemphasize, and/or isolate one or more spectral components of a temporal frame of the audible signal in the frequency domain. The frequency domain representations of the one or more frames are stored in the frame buffer 205, which is accessible to the spectral feature characterization module 210.

The spectral feature characterization module 210 is configured to generate a plurality of feature streams from the frequency domain representations of the one or more frames of audible signal data. In various implementations, the plurality of feature streams generated by the spectral feature characterization module 210 includes a first feature stream ($F_1$) that is suitable for an ensemble phoneme recognition neural network, which is included in the phoneme recognition system 300. Additionally, in some implementations, the plurality of feature streams generated includes one or more targeted feature streams ($F_2$ to $F_n$). As described below, each problematic phoneme feature stream is provided to a corresponding problematic phoneme-specific (or phoneme-class-specific) expert neural network that supports the operation of the ensemble phoneme recognition neural network.

In various implementations, the spectral feature characterization module 210 includes a characterization engine 220, a multiplexer (MUX) 211 (or selection module), and short-term spectral feature generation module 230. In various implementations, each of the plurality of feature streams ($F_1$, $F_2$ to $F_n$) includes any of a number and/or combination of signal processing features, such as mel-scaled cepstral coefficients, power normalized cepstral coefficients, linguistically informed spectral moments, frequency-domain linear prediction, group-delay function, a pitch estimation, a signal-to-noise ratio (SNR), a voice strength estimate, and a voice period variance estimate.

For example, in various implementations, the characterization engine 220 includes one or more sub-modules that are configured to analyze the frames in order to obtain feature characterization data. As shown in FIG. 2, the feature characterization module 220 includes a cepstrum analysis sub-module 221, a fundamental frequency ($f_0$) estimation sub-module 222, a mel-frequency cepstrum coefficients analysis sub-module 223, a power normalized cepstral coefficients analysis sub-module 224, a SNR estimation sub-module 225, a voice strength estimation sub-module 226, and a voice period variance estimation sub-module 227. Those of ordinary skill in the art will appreciate from the present disclosure that the functions of the aforementioned sub-modules can be combined into one or more sub-modules and/or further sub-divided into additional sub-modules; and, that the aforementioned sub-modules are provided as merely one example configuration of the various features described herein.

In some implementations, the cepstrum analysis sub-module 221 is configured to determine the Inverse Fourier Transform (IFT) of the logarithm of a frequency domain representation of a temporal frame. In some implementations, the fundamental frequency ($f_0$) estimation sub-module 222 is configured to provide a pitch estimate of voice activity in an audible signal. As known to those of ordinary skill in the art, pitch is generally an estimation of a dominant frequency characterizing a corresponding series of glottal pulses associated with voiced sounds. As such, the pitch estimation sub-module 222 is configured to identify the presence of regularly spaced transients generally corresponding to glottal pulses characteristic of voiced speech. In some implementations, relative amplitude and relative spacing identify the transients. In some implementations, the mel-frequency cepstrum coefficients (MFCCs) analysis sub-module 223 is configured to provide a representation of the short-term power spectrum of a frequency domain representation of a temporal frame. During MFCC processing, the logarithm is determined after passing the power spectrum through a mel-filter bank. The mel-filter bank includes a bank of triangular filters, the centers of which are at locations on the mel-scale (typically linear up to 1000 Hz and logarithmic thereafter). In some implementations, the power normalized cepstrum coefficients (PNCCs) analysis sub-module 224 is configured to provide another representation of the short-term power spectrum of a frequency domain representation of a temporal frame. The process for generating PNCCs is similar to that for generating MFCCs with a few modifications. First, a gammatone filter bank is used instead of triangular filter bank. Second, filter bank energies are filtered to remove noise and reverberation effects. Third, power law nonlinearity together with power normalization instead of a logarithm as is done in MFCC feature extraction is applied. In some implementations, linguistically informed spectral moments are calculated, providing a general description of the spectral shape of a time frame. In some implementations, Group-Delay functions are calculated using both the magnitude and phase spectra of a time frame. The two spectra are combined using multiples of themselves and an alpha and gamma parameter. In some implementations, the SNR estimation sub-module 225 is configured to estimate the signal-to-noise ratio in one or more of the frequency domain representations of the temporal frames. In some implementations, the voice strength estimation sub-module 226 is configured to provide an indicator of the relative strength of the target or dominant voice signal in a frame. In some implementations, the relative strength is measured by the number of detected glottal pulses, which are weighted by respective correlation coefficients. In some implementations, the relative strength indicator includes the highest detected amplitude of the smoothed inter-peak interval accumulation produced by an accumulator function. In some implementations, the voice period variance estimation sub-module 227 is configured to estimate the pitch variance in one or more of the frequency domain representations of the temporal frames. In other words, the voice period variance estimation sub-module 227 provides an indicator for each sub-band that indicates how far the period detected in a sub-band is from the dominant voice period P. In some implementations the variance indicator for a particular sub-band is determined by keeping track of a period estimate derived from the glottal pulses detected in that particular sub-band, and comparing the respective pitch estimate with the dominant voice period P.

In operation, the short-term spectral feature generation module 230 utilizes the MUX 211 in order to selectively activate the sub-modules of the characterization engine 220 for the generation of the plurality of feature streams ($F_1$, $F_2$ to $F_n$). In some implementations, the sub-modules that are selected are determined during the training of the network. This determination may be done using a multiple linear regression, which estimates the variance explained for a phoneme expert in a given generated feature stream. In other implementations, feature streams are selected based on a determination of linguistically relevant information for identifying a phoneme. The plurality of feature streams ($F_1$, $F_2$ to $F_n$) are provided to the phoneme recognition system 300, which is described in greater detail with reference to FIG. 3. The speech (or text) re-synthesis module 250 is configured to use the output of the phoneme recognition system 300 in combination with the formant templates (stored in buffer 260) in order to re-synthesize an audible speech signal (or a text translation) of the audible signal data received by the microphone 201.

Figure 3:
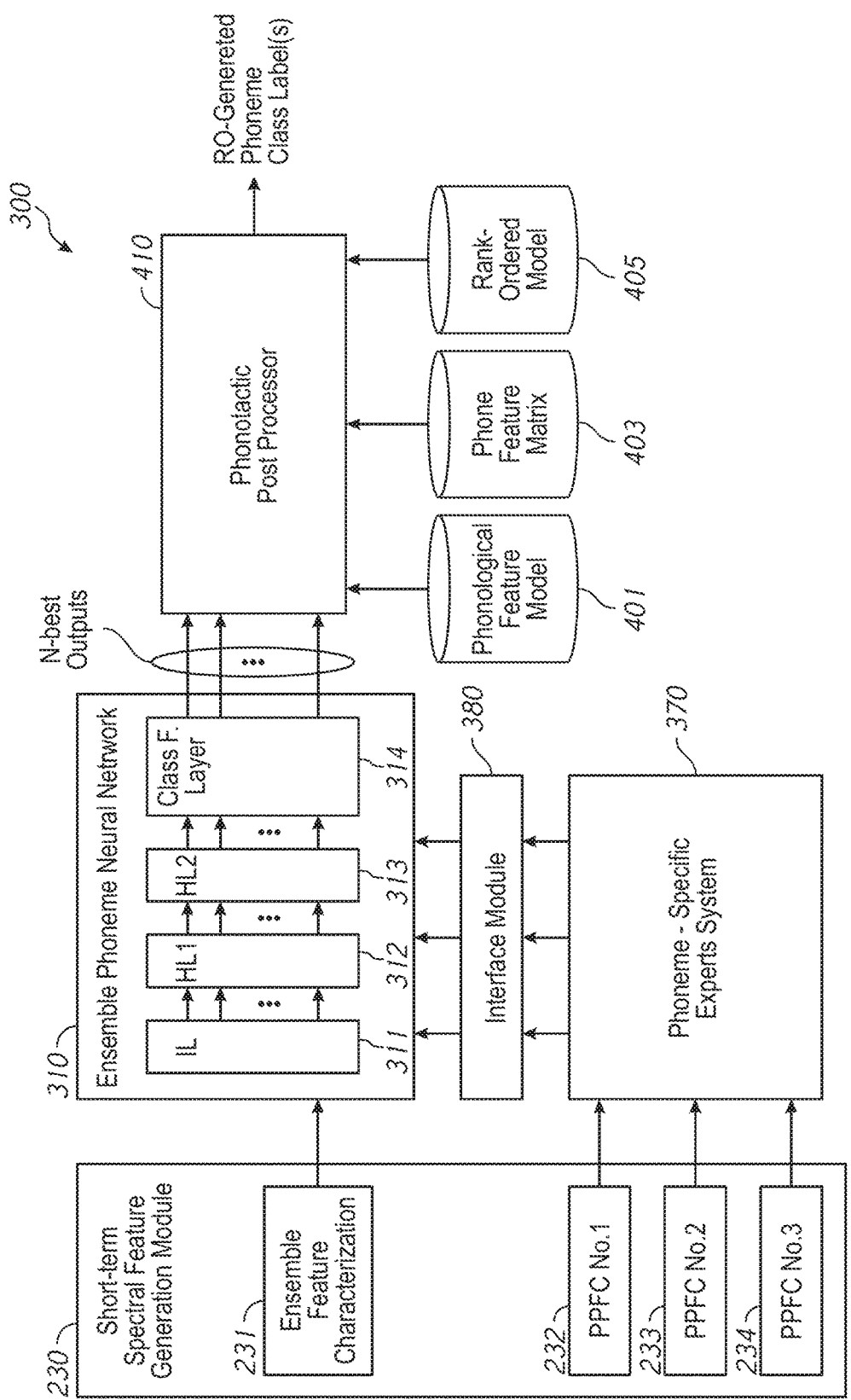
FIG. 3 is a block diagram of an implementation of a phoneme recognition system including a phonotactic post-processor according to some implementations.

FIG. 3 is a block diagram of the phoneme recognition system 300 in accordance with some implementations. FIG. 3 also includes a more detailed illustration of portions of the short-term spectral feature generation module 230 (shown in FIG. 2) that are pertinent to the phoneme recognition system 300. Again, while pertinent features are shown, those of ordinary skill in the art will appreciate from the present disclosure that various other features have not been illustrated for the sake of brevity and so as not to obscure more pertinent aspects of the example implementations disclosed herein.

As a non-limiting example, the phoneme recognition system 300, in various implementations, includes an ensemble phoneme recognition neural network 310, a phoneme-specific experts system 370, an interface module 380, a phonotactic post-processor 410. Additionally, in some implementations, the phoneme recognition system 300 also includes non-transitory memory allocations for a phonological feature model 401, a phone feature matrix 403, and a rank-ordered (RO) model 405.

The ensemble phoneme recognition neural network 310 is configured to recognize or distinguish individual phonemes with respect to all other phonemes. For a majority of phonemes, the ensemble phoneme recognition neural network 310 performs with a relatively high level of accuracy without support from the phoneme-specific experts system 370. As such, in various implementations, the phonotactic post-processor 410 is paired with the ensemble phoneme recognition neural network 310 (or another phoneme recognition system capable of outputting N-best phoneme candidates) without the use of the phoneme-specific experts system 370.

However, in various implementations, for problematic phonemes, the accuracy of the ensemble phoneme recognition neural network 310 is lower without the aid of the phoneme-specific experts system 370. Accordingly, the phoneme-specific experts system 370 is configured and provided to support the operation of the ensemble phoneme recognition neural network 310 in the process of recognizing problematic phonemes, which are difficult to detect and are frequently misidentified as other similar sounding phonemes.

In order to support the operation of the phoneme recognition system 300, the short-term spectral feature generation module 230 provides a plurality of feature streams ($F_1$, $F_2$ to $F_n$) for targeted uses. Each of the plurality of feature streams ($F_1$, $F_2$ to $F_n$) is generated from frequency domain representations of the one or more frames of audible signal data are stored in the frame buffer 205 (see FIG. 2). In some implementations, each feature stream is provided on a frame-by-frame basis. In various implementations, the plurality of feature streams includes a first feature stream ($F_1$) that is specifically generated (or synthesized) for the ensemble phoneme recognition neural network 310. In some implementations, the short-term spectral feature generation module 230 includes an ensemble feature characterization sub-module 231 that is configured to synthesize the first feature stream ($F_1$) for use by the ensemble phoneme recognition neural network 310. The first feature stream ($F_1$) is generated to include a sufficient number of spectral features in order to enable the ensemble phoneme recognition neural network 310 to recognize a majority of phonemes with relatively high accuracy. In some implementations, for example, the first feature stream ($F_1$) includes approximately 35-65 spectral features. In one implementation, approximately 40 power normalized cepstral coefficients (PNCCs) are included in the first feature stream ($F_1$).

Additionally, in various implementations, the plurality of feature streams generated by the short-term spectral feature generation module 230 includes one or more targeted problematic phoneme feature streams ($F_2$ to $F_n$)—which are also referred to as target feature streams. Each of the targeted feature streams ($F_2$ to $F_n$) is synthesized and provided to the phoneme-specific experts system 370 for use by a respective one of a number of constituent problematic phoneme-specific expert neural networks (PPENNs). Those of ordinary skill in the art will appreciate from the present disclosure that the targeted feature streams ($F_2$ to $F_n$) are not necessarily wholly independent from one another or the first feature stream ($F_1$). For example, PNCC coefficients in combination with other relevant features that target the second formant for "ih" versus "uh" detection may be included in two or more feature streams. In various implementations, in order to synthesize the targeted feature streams ($F_2$ to $F_n$) the short-term spectral feature generation module 230 includes a respective number of problematic phoneme feature characterization (PPFC) sub-modules. Each PPFC sub-module is configured to synthesize and provide a corresponding one of the targeted feature streams ($F_2$ to $F_n$) to a respective PPENN in the phoneme-specific experts system 370. As an example, the short-term spectral feature generation module 230 shown in FIG. 3 includes first, second and third PPFCs 232, 233, 234 that are respectively configured to produce corresponding second, third and fourth feature streams ($F_2$, $F_3$, $F_4$). Those of ordinary skill in the art will appreciate that in various implementations, a system may include one or more PPFCs, and that the three PPFCs are merely shown as an example.

Each problematic phoneme feature stream ($F_2$ to $F_n$) includes a respective set of targeted spectral features that characterize the a priori phonetic and acoustic knowledge utilized to identify a particular problematic phoneme. Each respective set of targeted spectral features is beneficial to a respective PPENN for distinguishing a single target problematic phoneme as distinct from one or two other specific phonemes based linguistically supported attributes. The one or two other specific phonemes are selected because the target problematic phoneme is highly likely to be misclassified as one of these phonemes without focused attention to the spectral feature differences—that the ensemble phoneme recognition neural network 310 is not configured to provide based on the desire to tightly constrain the resources of the system 300. As an example, if the second feature stream ($F_2$) is provided to help distinguish the phoneme "uh" from the phoneme "ih," the first PPFC 232 is configured to generate spectral features including PNCCs and a Gammatone filtered spectrum around the $2^{nd}$ and $3^{rd}$ formants. Similarly, in another example, in order to distinguish "th" from "f," a PPFC is configured to generate spectral features including PNCCs and linguistically informed spectral moments. In particular, the spectral slope is a significant source of contrast for distinguishing "th" from "f". As another example, to distinguish "b" from "d," a PPFC is configured to generate spectral features including PNCCs and group-delay features that isolate differences in the energy of respective plosive bursts for each sound.

The ensemble phoneme recognition neural network 310 is configured to recognize individual phonemes with respect to all other phonemes in a sequence of audible signal data. The ensemble phoneme recognition neural network 310 uses the spectral features included in the first feature stream ($F_1$) that was synthesized from the sequence of audible signal data obtained by the microphone 201. As noted above, for the majority of phonemes, the ensemble phoneme recognition neural network 310 performs with a relatively high level of accuracy without support from the phoneme-specific experts system 370. In various implementations, the ensemble phoneme recognition neural network 310 is able to recognize or distinguish a majority of phonemes with 75-80% accuracy (or above), and in some implementation within a tolerable error threshold ranging from 2-5%. However, in various implementations, for problematic phonemes, the accuracy of the ensemble phoneme recognition neural network 310 is lower without the aid of the phoneme-specific experts system 370. The problematic phonemes tend to occur rarely in nominal speech patterns for a particular language. For example, some problematic phonemes occur as low as 0.1% of the time in nominal speech patterns for a particular language, which is well below the typical lower boundary tolerable error threshold values. As a result, without the aid of the phoneme-specific experts system 370, the ensemble phoneme recognition neural network 310 is likely to misclassify a problematic phoneme as one or two other specific phonemes. In part, this is because the ensemble phoneme recognition neural network 310 is not configured to provide focused attention to the spectral feature differences. The ensemble phoneme recognition neural network 310 cannot provide that focused attention to the spectral feature differences without attendant exponential growth in computational complexity, memory demand, and inputs—which would make implementations unacceptable for low-power, real-time and/or low-latency devices, such as hearing aids and mobile devices. Accordingly, in various implementations, the ensemble phoneme recognition neural network 310 is tightly resource constrained, as compared to previously known neural network approaches.

Referring to FIG. 3, in various implementations, the ensemble phoneme recognition neural network 310 includes a LSTM (long short-term memory) RNN having an input layer 311, a first hidden layer 312, a second hidden layer 313, and a classification layer 314. While the ensemble phoneme recognition neural network 310 of FIG. 3 includes two hidden layers as an example, those of ordinary skill in the art will appreciate from the present disclosure that one or more additional hidden layers are also present in various implementations. Adding additional hidden layers adds to the computational complexity and memory demands, but may improve performance for some applications.

The input layer 311 is coupled to receive the first feature stream ($F_1$) from the ensemble feature characterization sub-module 231. The input layer 311 includes a number of LSTM logic units (not shown), which are also referred to as neurons by those of ordinary skill in the art. In some such implementations, input matrices to LSTM logic units include rectangular matrices. The size of this matrix is a function of the number of spectral features included in the first feature stream ($F_1$). The first hidden layer 312 also includes a number of LSTM logic units (not shown). Similar to the input layer 311, the number of LSTM logic units ranges between approximately 10-500. Those of ordinary skill in the art will appreciate that number of LSTM logic units per layer is orders of magnitude smaller than previously known approaches (being of the order of $O(10^1)$-$O(10^2)$), which allows such implementations to be embedded in highly resource-constrained devices.

In some implementations, the second hidden layer 313 includes at least as many logic units as in the input layer 311 or first hidden layer 312. The logic units in the second hidden layer 313 receive two sets of inputs. The first set of inputs comes from the previous hidden layer, and the second set of inputs come from the phoneme specific experts system 370 (via the interface module 380). Two separate rectangular weight matrices connect the two sets of inputs to the logic units in the second layer. In various implementations, the number of logic units in first set of LSTM logic units is approximately equal to the number of logic units in the input layer 311 or the first hidden layer 312. The classification layer 314 includes an implementation of a multinomial logistic function (e.g., a soft-max function) that produces a number of outputs that is approximately equal to the number of phonemes. Each output includes a probability or a confidence measure for a particular phoneme as determined by the RNN for the current spectral frame. Each probability is referred to as a posterior probability, and the N-best are provided to the phonotactic post-processor 410.

In various implementations, the classification layer 314 is also configured to include a number of outputs that corresponds to a total number of possible unique phonemes that could be detected within continuous large vocabulary speech sequences. In some implementations, the superset of all phonemes present in any human language can be used as possible unique phoneme outputs. This superset may include more than 80 consonants, more than 30 vowels and a multitude of clicks. In other implementations, for efficiency, the set of unique phonemes will be a subset of the all-phoneme superset, tailored to a specific language (e.g., 39 phonemes for American English). The N-best outputs are provided to the phonotactic post-processor 410. In various implementations, the phonotactic post-processor 410 is configured to select the top N phoneme candidates based on the corresponding values provided at the outputs of the classification layer 314. In some implementations, the top N phoneme candidates are the most likely phonemes present in a given frame.

In operation, the ensemble phoneme recognition neural network 310 learns to make decisions from the combination of sub-optimal detection indicator values received from the phoneme-specific experts system 370. In particular, the ensemble phoneme recognition neural network 310 learns to balance sub-optimal detection indicator values associated with one or more conflicting problematic phonemes, as opposed to making hard decisions based on just one of the sub-optimal detection indicator values. Indicator values from the phoneme-specific experts system 370 are appended to activation values from a previous processing layer going into a subsequent layer of the ensemble phoneme recognition network 310. The indicator values are weighted appropriately when provided as higher-level features to the logic units of the subsequent layer. If the layer at which the indicator values are introduced contain recurrent logic units, the indicator values could also feedback into other logic units of the same layer through weighted recurrent connections. The weight values to logic units in the subsequent layer and current layer (recurrent connections) are learned from the data. The learning takes place in the context of a back-propagation method that works by looking misclassifications in the output layer and generating an error signal. A gradient is calculated for the weights in that layer so that the error is reduced. The error signal coming from the output layer is then propagated back to the layers below. Gradients are similarly calculated for all sets of weights in the hidden layers so that the misclassification in the output layer is reduced. The gradient updates are applied to each set of weights after looking at either an entire speech sequence or a set of speech sequences. In learning these weights by associating these indicator values to the phoneme labels during training, the network is able to learn when to use these indicator values and when to ignore them. During training, classification errors are propagated backward through the ensemble phoneme recognition network 310 in order to adjust and learn the weights so that misclassifications on subsequent examples are reduced. The errors that are propagated back to the point of entry of the indicator values are used only to update the weights connecting the outputs of the experts to logic units (of the ensemble phoneme recognition network 310) in the subsequent processing layer and the weights connecting to the logic units (of the ensemble phoneme recognition network 310) in the same layer.

In various implementations, the phoneme-specific experts system 370 includes a number of problematic phoneme-specific expert neural networks (PPENNs). In some implementations, each of the PPENNs includes a respective low complexity LSTM RNN. For example, in various implementations, each respective low complexity LSTM RNN includes two layers, which each have 10-30 logic units (or neurons). Each respective low complexity LSTM RNN is configured to make a determination regarding the presence of a specific target problematic phoneme based on a corresponding feature stream ($F_2$ to $F_n$).

In various implementations, each of the PPENNs is included in a respective processing chain that is configured to distinguish a respective target problematic phoneme as distinct from one or two other specific phonemes. In various implementations, each processing chain is provided for at least one problematic phoneme that conflicts with at least one other problematic phoneme, in terms of being similar sounding and difficult to distinguish from one another. In other words, in some implementations, a processing chain provides a detection indicator value for at least one problematic phoneme that conflict with at least one other problematic phoneme that is associated with another processing chain. For example, in various implementations, one or more PPENNs are provided in combination within the phoneme-specific experts system 370 as follows.

Rather than detecting classes of phonemes like the structured neural networks of previous approaches, each of the PPENNs is configured and trained to recognize, or estimate detection of, a single target problematic phoneme as distinct from one or two other specific phonemes. In some instances, but not always, the one or two other specific phonemes are within the same class of phonemes as the target problematic phoneme. The one or two other specific phonemes are selected because the target problematic phoneme is highly likely to be misclassified as one of these phonemes without focused attention to the spectral feature differences (e.g., the phonemes "uh" and "ih" are very difficult to distinguish using previously available machine-listening approaches). As noted above, the ensemble phoneme recognition neural network 310 cannot provide that focused attention to the spectral feature differences without attendant exponential growth in computational complexity, memory demand, and inputs from the short-term spectral feature generation module 230. As such, a respective output of each of the PPENNs includes a corresponding detection indicator value provided to a hidden layer of the ensemble phoneme recognition neural network 310. As described above, in some implementations, the detection indicator values are provided to logic units in the second hidden layer 313. Additionally and/or alternatively, in some implementations, the detection indicator values are provided to logic units in the first hidden layer 312 and/or to another hidden layer (not shown)

included between the second hidden layer 313 and the classification layer 314. In some implementations, the detection indicator value provides an indication characterizing when the PPENN has detected the target problematic phoneme in accordance with a detection threshold associated with the target problematic phoneme.

As noted above, the plurality of feature streams generated by the short-term spectral feature generation module 230 includes one or more targeted feature streams ($F_2$ to $F_n$)—the corresponding second, third and fourth feature streams ($F_2$, $F_3$, $F_4$) as illustrated in FIG. 3 as an example. Each of the targeted feature streams ($F_2$, $F_3$, $F_4$) is provided to a respective processing chain including one of the PPENNs.

Each of the PPENNs then operates to determine a corresponding detection indicator value. In some implementations, the detection indicator value provides an indication characterizing when a PPENN has detected the target problematic phoneme in accordance with a detection threshold. In some implementations, each of one or more problematic phonemes is associated with a particular corresponding detection threshold based on the targeted spectral features selected for use by a particular PPENN. In some implementations, the detection indicator value provides a confidence level (e.g., a probability value) characterizing the extent to which portions of an audible signal satisfy a detection threshold. In some implementations, the detection indicator value provides a flag indicating a binary detection result.

The detection indicator values are provided to the interface module 380. In various implementations, the interface module 380 includes a number of logic units configured to provide a gating function between the phoneme-specific experts system 370 and the ensemble phoneme recognition neural network 310. The interface module 380 helps to interface the output of the phoneme-specific experts system 370 with the ensemble phoneme recognition neural network 310. A phoneme-specific expert could have either one or two outputs. In some implementations, in the case of a single output (with an output sigmoidal unit), the value is ranges between 0 and 1. A high value indicates the presence of target phoneme, and a zero indicates otherwise. In some implementations, in the case of two outputs (with a soft-max layer), one of the outputs indicates the presence of the target phoneme and the other output indicates the presence of a competitor phoneme. In some implementations, in the soft-max layer both outputs are constrained to sum to 1, and the two outputs are complementary to each other.

For example, considering experts with two outputs per expert, the outputs from all experts can be collected into a vector: $p_t = [p_1\ 1-p_1\ p_2\ 1-p_2\ \ldots\ p_E\ 1-p_E]$.

In some implementations, the interface module 380 utilizes the vector $p_t$ within a function $f$ operating on the vector $p_t$ to produce a vector output $q_t = f(p_t)$. In various implementations, the function can range in complexity between an identity function to a more complex non-linear function like a typical neural network sigmoidal unit or a set of LSTM/GRU units. This output vector $q_t$ is then weighted by a matrix $W_{qx}$ (x denotes the respective input/gate of the LSTM unit in the next layer) and appears as an additive term to the standard LSTM equations as follows.

$$h_t = o_t \tan h(c_t) \quad (1)$$

$$o_t = \tan h(W_{xo}x_t + W_{ho}h_{t-1} + W_{qo}q_t + b_o) \quad (2)$$

$$f_t = \tan h(W_{xf}x_t + W_{hf}h_{t-1} + W_{qf}q_t + b_f) \quad (3)$$

$$i_t = \tan h(W_{xi}x_t + W_{hi}h_{t-1} + W_{qi}q_t + b_i) \quad (4)$$

$$r_t = \tan h(W_{xc}x_t + W_{hc}h_{t-1} \ 'W_{qc}q_t + b_c) \quad (5)$$

The phonotactic post-processor 410 is configured to rescore (e.g., evaluate and potentially reorder) the N-best phoneme candidates output by ensemble phoneme recognition neural network 310 using a priori phonotactic information. In various implementations, one of the scored set of the N-best phoneme candidates is selected as a preferred estimate for a one-phoneme output decision by the phonotactic post-processor 410. In some implementations, the one-phoneme output decision is an estimate of the most likely detectable phoneme in a frame based on a function of posterior probabilities generated by ensemble phoneme recognition neural network 310 and phonotactic information incorporated by the phonotactic post-processor 410.

In various implementations, the output of the ensemble phoneme recognition neural network 310 is a vector of posterior probabilities over possible output classes, $p(c^{(t)}|x^{(t)})$, where boldface c indicates the vector of class identities for all classes $c_i \in C$, x denotes the vector of acoustic features input to the ensemble phoneme recognition neural network 310, and the superscript t denotes the index (in this case the temporal index) of a training sample $t = 1 \ldots T$. In various implementation, for phoneme detection and recognition, this amounts to the posterior probability of each class given the acoustic features calculated over a given analysis frame (e.g., 64 ms) at some time t. In one specific implementation this includes 13 PNCCs, first and second derivatives ($\Delta$s & $\Delta\Delta$s) of the PNCCs, and one energy coefficient—yielding a 40 dimensional acoustic feature vector. In more general terms, post-processing of these output probabilities often takes place as a final step in the classification task by the phonotactic post-processor 410.

In various implementations, the phonotactic post-processor 410 has two constraints. First, the phonotactic post-processor 410 is configured to operate causally in real time. Consequently, decisions made by the phonotactic post-processor 410 are limited to current and past information coming from the ensemble phoneme recognition neural network 310. This restriction eliminates the possibility of using a Hidden Markov Model (HMM) formalism backend with the forward-backward algorithm, since this would require performing both a forward and a backward pass through the data to arrive at output decisions, thereby introducing latency into the system. Second, the phonotactic post-processor 410 is configured to be able to run on low-memory, low-power hardware. By contrast, previously available phoneme recognition systems using DNN-HMM hybrid architectures have tens of millions of parameters that model states in left-to-right HMM decoders, which clearly is not suitable for the target devices, such as hearing aids and mobile devices (e.g., smartphones, wearable devices, etc.).

In various implementations, the functionality of the phonotactic post-processor 410 is to: identify the class that improves the likelihood of the acoustic data in a feature vector x given the posterior probability density over classes output by the ensemble phoneme recognition neural network 310, combined with other sources of information. To these ends, the configuration and operation of various implementations of the phonotactic post-processor 410 are different from the conventional HMM approach in several ways.

In various implementations, the phonotactic post-processor 410 is configured to identify a one-phoneme output candidate in the N-best candidate list from the ensemble phoneme recognition neural network 310 (or the like). The phonotactic post-processor 410 leverages this constraint on the problem space by using a novel decoding scheme which is referred to rank-ordered (RO) decoding hereinafter, which is not used in conventional HMM implementations. Additionally, in various implementations, RO-decoding is combined with language model scores defined in terms of phonological features. This too represents a notable divergence from the conventional HMM framework, since the phonotactic post-processor 410 does not directly model transitional probabilities between the output classes of the ensemble phoneme recognition neural network 3101. In various implementations, these features are combined to rescore posterior probabilities (produced by the ensemble phoneme recognition neural network 310) in a low memory footprint, method that executes in real time or near real-time.

Figure 4:
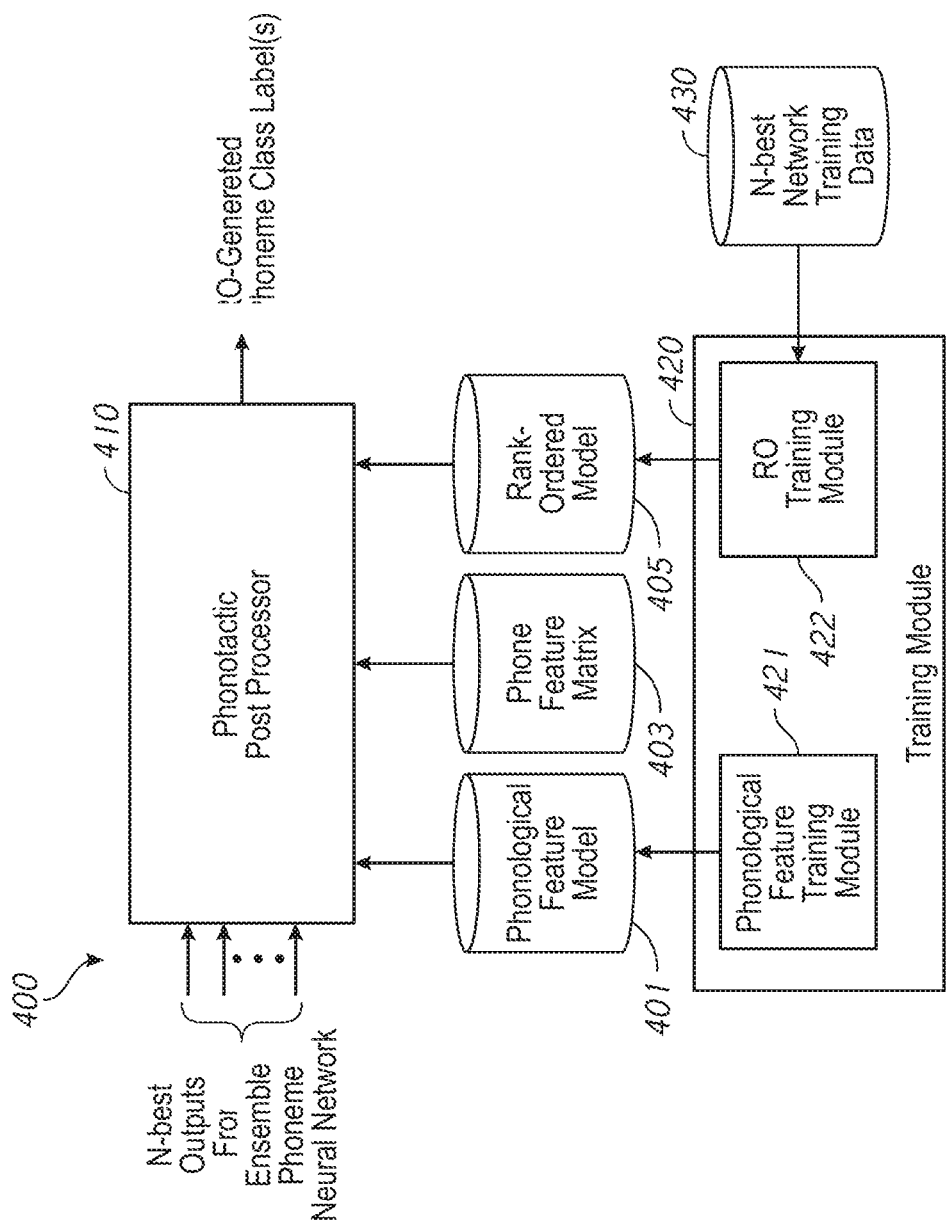
FIG. 4 is a block diagram of a phonotactic post-processor system according to some implementations.

FIG. 4 is a block diagram of a phonotactic post-processor system 400 according to some implementations. Portions of FIG. 4 are adapted from FIG. 4, and as such, elements common to each include common reference numbers, and only the differences between FIGS. 3 and 4 are described herein for the sake of brevity. Again, while pertinent features are shown, those of ordinary skill in the art will appreciate from the present disclosure that various other features have not been illustrated for the sake of brevity and so as not to obscure more pertinent aspects of the example implementations disclosed herein.

With reference to FIG. 4, the phonotactic post-processor system 400 depicts both pertinent training components and runtime components. The training components—training module 420 and N-best network training data 430—are used to synthesize multidimensional probability arrays such as, for example, the phonological feature model 401, the phone feature matrix 403, and the RO model 405. Within the phonotactic post-processor system 400, the phonological feature model 401, the phone feature matrix 403, and the RO model 405 are accessed in real-time to decode and rescore the N-best neural network output probabilities in order to arrive at a one-phoneme class label for a given input acoustic feature vector x. In various implementations, the process of RO-decoding and rescoring effectuated by the phonotactic post-processor 410 the received posterior probabilities is also referred to as correction. In various implementations, the process involves the integration of: a) class posterior probabilities output by the ensemble phoneme recognition neural network 310; b) behavioral characterizations of the ensemble phoneme recognition neural network 310 generated by the phonotactic post-processor 410 during a training mode; and c) phonotactic information in the form of a phonetic feature model (as described below with reference to FIG. 6).

Phonological features (or attributes) are descriptive labels of characteristics of speech sounds. Although there are several different feature systems in common use (e.g., Articulatory Phonology, and the SPE feature system), nearly all phonological feature systems are tied directly to aspects of the articulation of a given speech sound using the human vocal tract. For example, the vowel /ae/ as in 'bat', in terms of SPE features, could be described as a {low, front, tense, voiced, vocalic} sound, where the curly brackets indicate a set. This means that the vowel is produced with the tongue in a low position toward the front of the mouth, with the vocal chords vibrating and a relatively open vocal tract configuration that produces a tube-like shape with resonance characteristics that yield formant structure.

Figure 5:
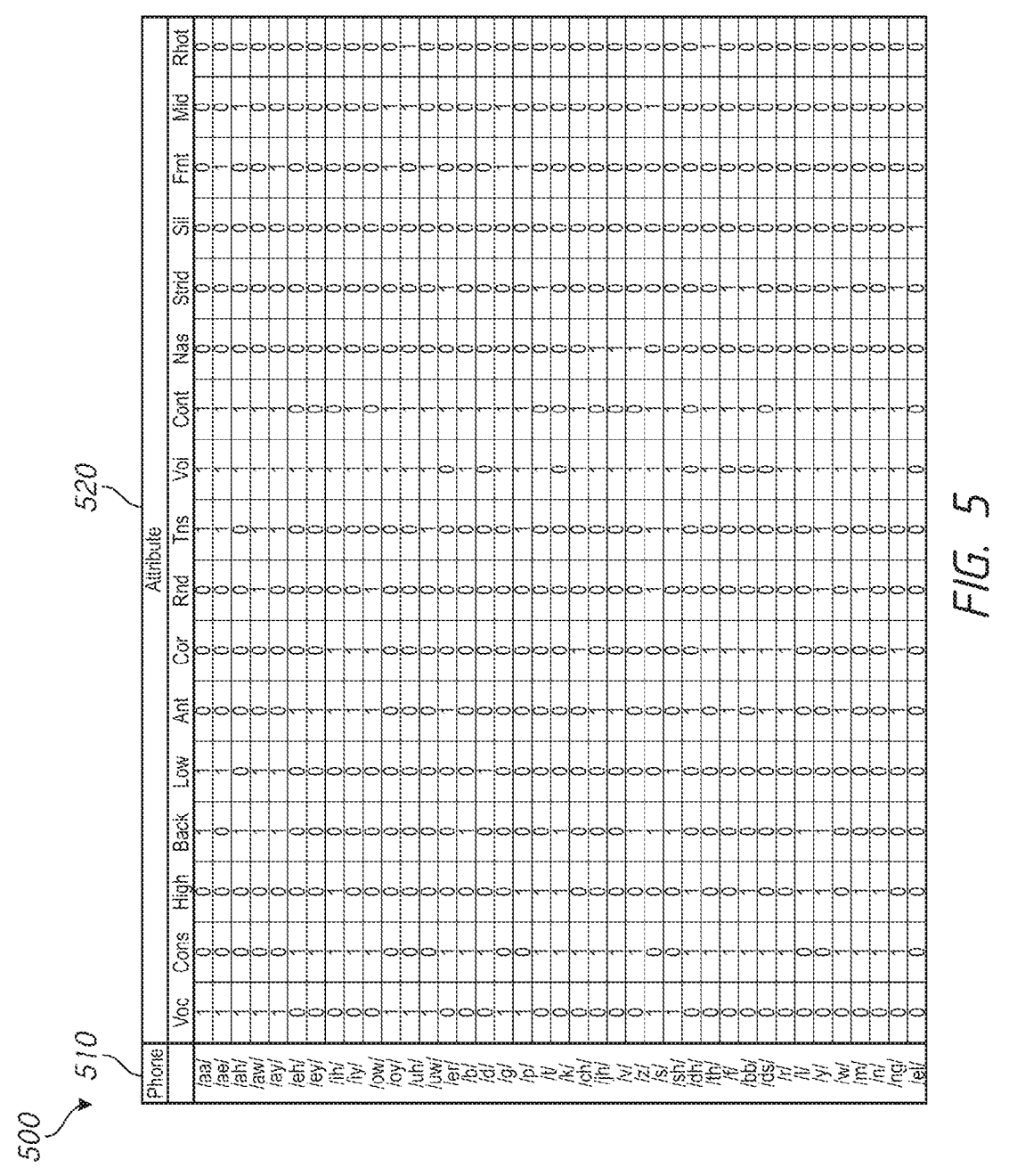

Phonological features are useful in that they provide a language independent means of describing relations among phonemes (phonotactics) in terms of lower-level phonetic characteristics. Using the SPE feature system, for example, this means re-encoding the phonemes of a language in terms of a set of binary valued features, each of which takes on a value in {0,1} for a given phoneme, with "0" meaning the phone 'does not have' the property represented by that feature, and "1" meaning that the phone 'does have' that feature. Within this feature system, the features are said to be 'distinctive' in that each phoneme in the language will have a unique specification when it is described in terms of its feature values; the feature specifications themselves serve to distinguish the sounds of the language from one another. As an illustrative example, FIG. 5 is an example of a representation of phone feature matrix 500 synthesized in accordance with some implementations. The phone feature matrix 500 includes a first column 510 of phones (i.e., phonemes), and a plurality of second columns 520 including a respective set of binary valued features for each of the phones in the first column 510.

In operation, in order to decode and rescore the N-best candidates, the phonotactic post-processor 410 makes use of a priori statistical knowledge of phonological feature sequences. This includes defining a set of features to use, and defining an encoding for target phonemes (the possible output classes of the ensemble neural network 310) in terms of these features. In some implementations, 17 binary valued features (or attributes) are used as shown in the plurality of second columns 520 of the phone feature matrix 500 of FIG. 5. Additionally, for example, in some implementations, a set of 39 (condensed from 61) TIMIT corpus phoneme target classes—shown in the first column 510—are encoded in terms of the binary valued features shown in the plurality of second columns 520. It should be emphasized that this aspect of the phonotactic post-processor 410 is flexible—as any suitable set of binary valued features can be used in various implementations. Substituting a different set of features includes defining an encoding for the target classes in an array, and training using the encoding.

In some implementations, the phonological statistical characterizations, stored in the phonological feature model 401, are generated during a training mode using the known Buckeye corpus, which is a large corpus of spontaneous conversational speech. The Buckeye corpus provides training data that mirrors a target application of continuous large vocabulary speech recognition. In various implementations, maintaining this kind of consistency between training data and runtime conditions is preferred because speaking modality can greatly change the nature of speech, and models derived from training data in one modality often do not perform well when tested in other modalities (e.g., using models trained on single-sentence recitations applied to continuous speech).

Figure 6:
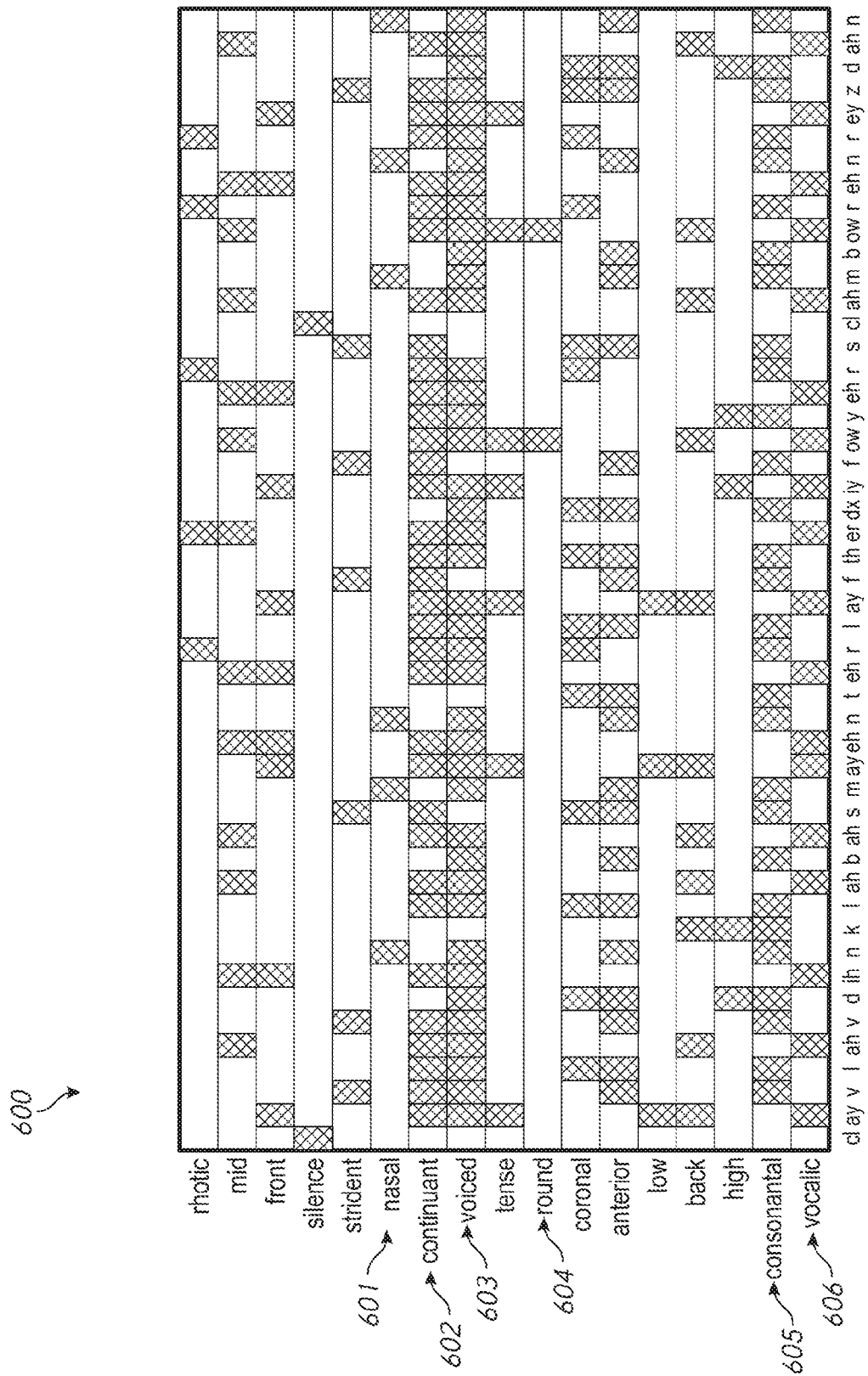
FIG. 6 is an example of a representation of phonological feature stream in accordance with some implementations.

FIG. 6 is an example of a representation of a phonological feature stream 600 in accordance with some implementations. In particular, the phonological feature stream 600 shows a portion of a stream of continuous speech that has been encoded in terms of the representation defined by the phone feature matrix 403 (of FIGS. 4 and 5). FIG. 6 shows that each of the features is associated with a time-series stream of values in the set {0, 1}. Qualitatively, FIG. 6 shows that the features behave very differently when viewed as continuous time-series streams. For example, the consonantal stream 605 and the vocalic stream 606, which describe whether a particular sound is a consonant or a vowel, tend to change state relatively quickly, maintaining a given state for at most three consecutive phones. The continuant stream 602 and voiced stream 603, on the other hand, tend to change state relatively slowly, while the round stream 604 and the nasal stream 601, are only intermittently in the {1} state.

The phonological feature stream 600 is provided to illustrate that phonological features provide a useful characterization of active articulatory processes generating speech, and that each phonological feature contributes different types of information about the organization of a continuous speech stream. This is to say that phonological feature encoding provides a representation of information that accurately characterizes multiple time-varying processes underlying the organization of speech as a priori information for use in phonemic recognition system 300 of FIGS. 2 and 3.

This contrasts with conventional approaches to phoneme recognition, which are typically defined on a single level of linguistic representation. For example, previously available HMM language models for phoneme recognition rely on limited length phoneme sequence information as the only source of sequence information, which poses a limitation, given the hierarchical organization of language, and the existence of sequential organizing principles across and within these various levels. In turn, for recognition using 39 phonemes, this results in the use of upwards of 393 states.

By contrast, in various implementations, the phonological feature training module 421 is configured to synthesize an N-gram phonological feature language model, namely the aforementioned phonological feature model 401. Each of the N-grams include sequences of phonological features taking on one of two binary valued states: {0,1}, as defined by the phone feature matrix 403. In various implementations, the sequence length is limited to 2-grams (bigrams). This results in a language model with a size that is constrained to 17 features×17 features×4 possible bigram states, where the four possible states are {0-0, 0-1, 1-0, 1-1}. As noted above, in some implementations, the phonological feature training module 421 uses the Buckeye corpus to train maximum likelihood probability estimates of each feature bigram state (e.g., the sequence nasal{0}-nasal{1}). These probabilities are then stored in a multidimensional array in memory (e.g., the memory allocation for the phonological feature model 401), and utilized at runtime by the phonotactic post-processor 410 in order to select a one-phoneme candidate given the a priori phonotactic information of continuous speech generated by the phonological feature training module 421.

Returning again to FIGS. 3 and 4, in addition to phonotactic knowledge, the phonotactic post-processor 410 also incorporates a novel mechanism for selecting among the N-best candidates produced by the ensemble phoneme recognition neural network 310, which is referred to as rank-ordered (RO) decoding herein. As noted above, the phonotactic post-processor 410 selects from a set of phoneme candidates C, including members $\{c_i, c_{i+1} \ldots c_{n-1}, c_n\}$, for i=1 . . . N, where N is the size of the N-best list. The set of N-best candidates is a subset of the possible output classes of the ensemble phoneme recognition neural network 310, and each candidate has an associated posterior probability $P(c_i|x)$. In some implementations, an N-best list of candidates with N=5 contains the correct target phoneme 95% of the time. However, the output class with the highest probability (the top ranked choice of the N-best list) is the correct target approximately 70% of the time, and errors can frequently be associated with a posterior probability of over 0.9 for the top candidate.

In various implementations, with RO-decoding, the phonotactic post-processor 410 incorporates statistical characterizations of the performance of the ensemble phoneme recognition neural network 310—specifically with respect to the tendency of the correct candidate likely to be one of the other of the N-best candidates if not the top candidate. For example, as noted above the top candidate provided by the ensemble phoneme recognition neural network 310 typically is the correct target 70% of the time. In a Bayesian framework, this would be the prior probability that the top choice is correct. In some implementations, the sequential behavior of the N-best candidates is used to generate a preferred estimate for a one-phoneme output decision by the phonotactic post-processor 410. The one-phoneme output decision is an estimate of the most likely detected and recognized phoneme in a frame based on a function of posterior probabilities generated by ensemble phoneme neural network 310, as well as phonotactic information and statistical performance characterizations incorporated by the phonotactic post-processor 410. For example, the actual correct target frequently appears as the second best network candidate at a particular time $t_i$, only to be correctly identified as the top candidate at the next instance $t_{i+1}$. In various implementations, the phonotactic post-processor 410 incorporates such statistical characterizations of the performance of the ensemble phoneme recognition neural network 310 by using RO-decoding.

Figure 8:
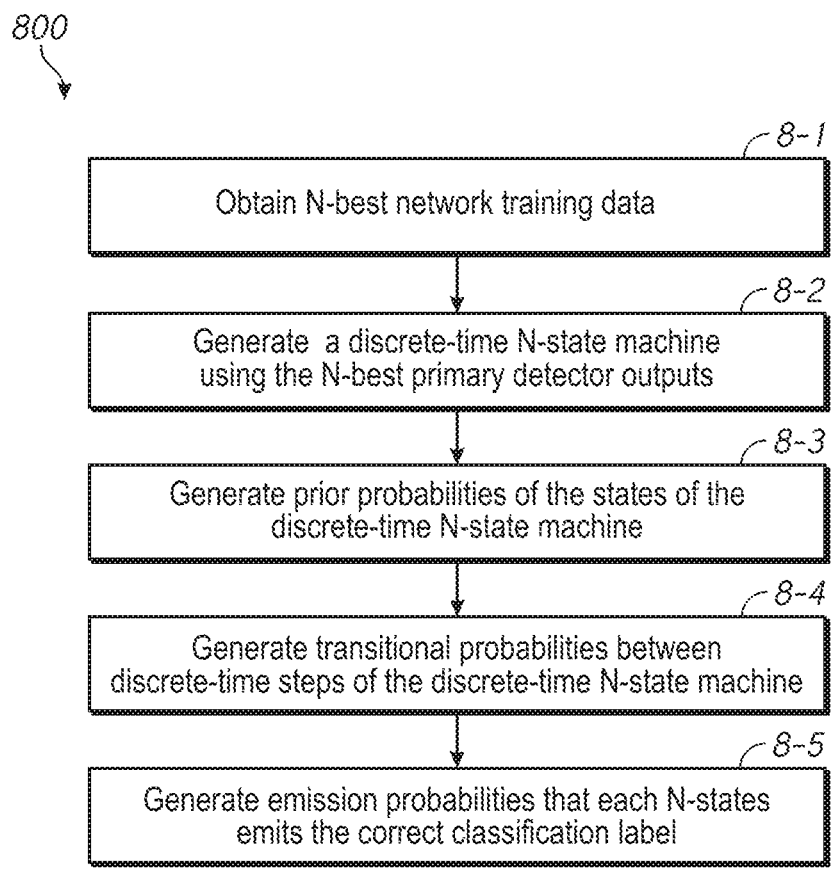
FIG. 8 is a flowchart representation of a method of synthesizing a rank-ordered model suitable for use by a phonotactic post-processor

In various implementations, an in accordance with RO-decoding as presented herein, statistical characterizations of the performance of the ensemble phoneme recognition neural network 310 are incorporated by modeling the N-best candidate outputs as latent states in a discrete-time N-state machine in combination with the N-best network training data 430. Subsequently, the RO training module 422 determines, using the N-best network training data 430, the probability of a correct classification appearing as the output of each of these five states in order to generate the RO-model 405—which is used during runtime by the phonotactic post-processor 410. To that end, FIG. 8 is a flowchart representation of a method 800 of synthesizing a rank-ordered model suitable for use by a phonotactic post-processor. With continued reference to FIG. 8, and with additional reference to FIGS. 3 and 4, in some implementations the method 800 is performed by a rank-ordered training module (e.g., RO training module 422) and the phoneme recognition system 300. Briefly, the method 800 includes determining statistical characterizations of the performance of an ensemble phoneme recognition neural network or the like (e.g., the ensemble phoneme recognition neural network 310 of FIG. 3).

In some implementations, as represented by block 8-1, the method 800 includes obtaining N-best network training data generated by an ensemble phoneme recognition neural network or the like. For example, with reference to FIGS. 3 and 4, the ensemble phoneme recognition neural network 310 generates N-best network training data 430 and stores it in a non-transitory memory allocation. The RO training module 422 obtains the N-best network training data 430 by access the non-transitory memory allocation.

Figure 7:
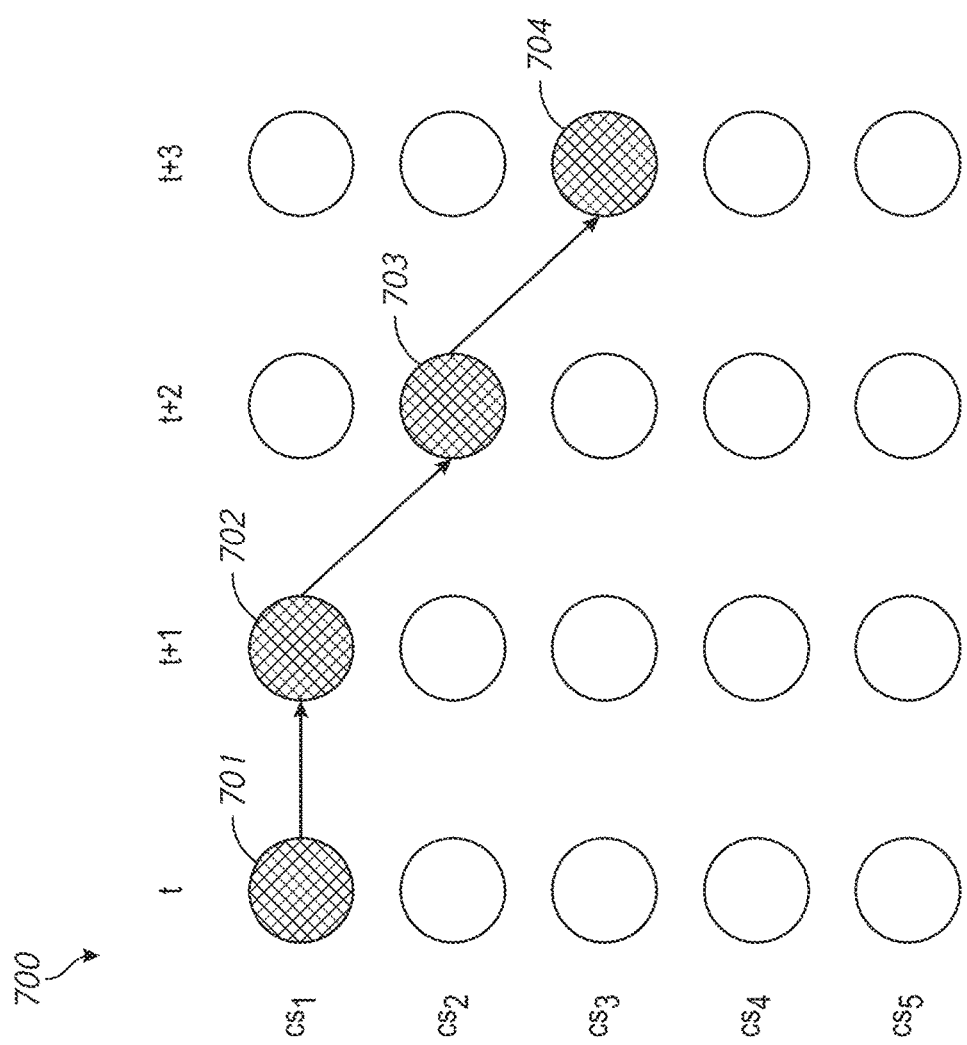
FIG. 7 is a diagram of a directed state graph illustrating an example path resulting from (post-processing) rank-ordered decoding of N-best phoneme candidates in accordance with some implementations.

As represented by block 8-2, in some implementations, the method 800 includes generating a discrete-time N-state machine using the N-best network training data. For example, with reference to FIGS. 3 and 4, the RO training module 422 and/or phonotactic post-processor 410 generate a discrete-time N-state machine using the N-best network training data 430 in order to evaluate the N-best candidate outputs as latent states of the discrete-time N-state machine. That is, each of the N-best candidate 'outputs' is modeled as a state in a discrete-time N-state machine. For example, with N=5, a five-state machine is generated. This example is continued with additional reference to FIG. 7 as follows. FIG. 7 is directed state graph 700 illustrating an example path generated by RO-decoding using a discrete-time 5-state machine according to some implementations. The discrete-time 5-state machine includes five states $cs_1, cs_2, cs_3, cs_4, cs_5$ corresponding to the expected 5-best phoneme candidates provided by the ensemble phoneme recognition neural network 310. In various implementations, by defining the discrete-time N-state machine as first order, the discrete-time N-state machine limits a decision process to the current state at time t, and the previous state at time t−1, when specifying probabilistic characterization.

Subsequently, the RO training module 422 determines, using the N-best network training data 430, the probability of a correct classification appearing as the output of each of these five states in order to generate the RO-model 405—which is used during runtime by the phonotactic post-processor 410. To that end, as represented by block 8-3, in some implementations, the method 800 includes generating prior probabilities of the states the discrete-time N-state machine. In some implementations, the prior probabilities include a respective probability that each of the N-best candidate-states produces the correct target. As an illustrative example only, with reference to FIG. 7, the RO training module 422 determines the prior probabilities as $P(c_1=target|cs_1)=0.7$, $P(c_2=target|cs_2)=0.15$, $P(c_3=target|cs_3)=0.05$, $P(c_4=target|cs_4)=0.025$, $P(c_5=target|cs_5)=0.025$.

As represented by block 8-4, in some implementations, the method 800 includes generating transition probabilities between the discrete-time steps of the discrete-time N-state machine. For example, in some implementations, the RO training module 422 generates the transitional probabilities as the probability of state $cs_i$ at time t producing the correct candidate, followed by state $cs_j$ producing the correct target at time t+1, for all i and j. This can be thought of as the probability of the correct choice 'moving' from one state to another in the directed graph 700, where each state is a position in the N-best rank ordering. As represented by block 8-5, in some implementations, the method 800 includes generating a respective probability of each of the rank-ordered states ($cs_1$, $cs_2$, $cs_3$, $cs_4$, $cs_5$) emitting a given output class as the correct choice. These function analogously to the 'emission' probabilities in the classical Viterbi framework, but differ notably in the use of the correct choice constraint. With additional reference to FIG. 7, the correct state follows the path indicated by the shaded states 701, 702, 703, 704 from time t through to time t+3, at which time $cs_3$ is selected as the correct state.

Figure 9:
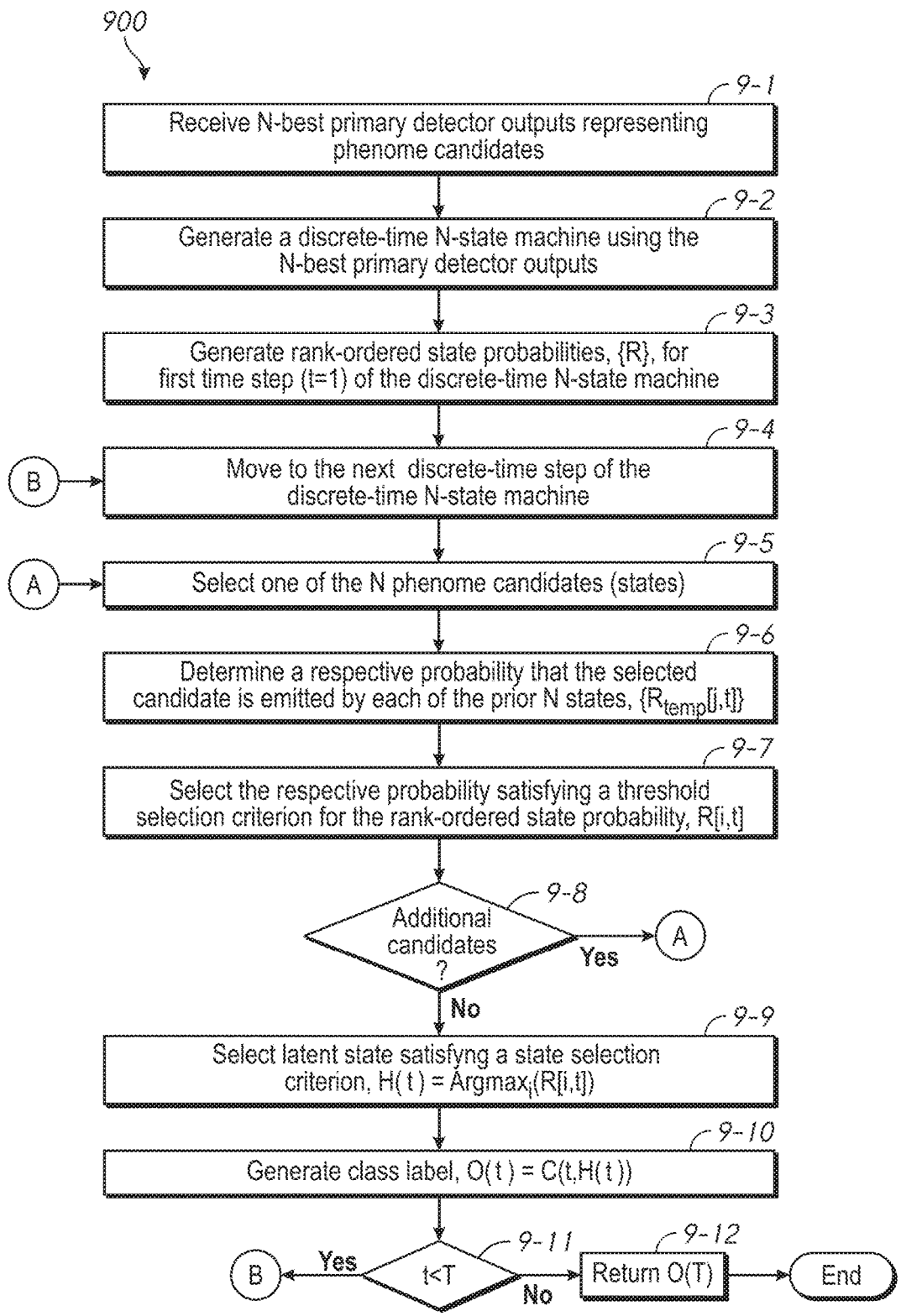
FIG. 9 is a flowchart representation of a method of rank-ordered decoding of N-best phoneme candidates in accordance with some implementations.

FIG. 9 is a flowchart representation of a method 900 of runtime RO-decoding in accordance with some implementations. With additional reference to FIGS. 3 and 4, in some implementations the method 900 is performed by the phoneme recognition system 300, and in particular by the phonotactic post-processor 410. Briefly, the method 900 includes, for each current $\{cs_1\}$ candidate, generating a respective probability of a predicted class label being emitted at a respective N-best rank by the ensemble phoneme recognition neural network 310 given the probability of the rank-ordered states computed at the previous time step, and selecting a candidate satisfying a selecting criterion as the preferred current choice. In some implementations, posterior probabilities are scaled by emission probabilities of the RO-decoding model states (e.g., Q[j, t]/E[i, ind(C[t, i], ⌊)]). This rescales the network outputs with respect to the a priori probability that the output class label at rank i in the N-best list is the correct target. In turn, the method 900 includes obtaining the likelihood of the acoustic data $P(x|c_m)$, where the likelihood is scaled with respect to the probability of emitting cm as a correct classification at rank $cs_i$.

To that end, as represented by block 9-1, in some implementations the method 900 includes receiving N-best primary detector outputs representing the phoneme candidates for a particular frame. For example, with reference to FIG. 3, the phonotactic post-processor 410 receives N-best (e.g., N=5 as in FIG. 7) outputs from the ensemble phoneme recognition neural network 310. As represented by block 9-2, in some implementations, the method 900 includes generating a discrete-time N-state machine using the N-best primary detector outputs. For example, with reference to FIG. 3, the phonotactic post-processor 410 generates a discrete-time N-state machine using the N-best primary detector outputs.

As represented by block 9-3, the method 900 includes generating RO state probabilities $\{R_1\}$ for the first time step of the discrete-time N-state machine. For example with reference to FIG. 7, RO state probabilities are generated for the five candidate states $cs_1$, $cs_2$, $cs_3$, $cs_4$, $cs_5$. As represented by block 9-4, the method 900 includes moving to the next discrete-time step in the N-state machine. As represented by block 9-5, the method 900 includes selecting one of the N-states (i.e., selecting one of the N phoneme candidates). As represented by block 9-6, the method 900 includes determining a respective probability (e.g., $\{R_{temp}[j,t]\}$ in the pseudo-code below) that the selected phoneme candidate is emitted by each of the prior N states in the N-state machine. As represented by block 9-7, the method 900 includes selecting a respective probability, from the generated set $\{R_{temp}[j,t]\}$, that satisfies a threshold selection criterion (e.g., R[i, t]=$\max_j$ (Rtemp)) for the RO state probability R[i,t].

As represented by block 9-8, the method 900 includes determining whether or not there are additional phoneme candidates to evaluate. If there are additional phoneme candidates left to evaluate ('Yes' path from block 9-8), the method circles back to the portion of the method represented by block 9-5. On the other hand, if there are no additional phoneme candidates left to evaluate ('No' path from block 9-8), as represented by block 9-9, the method 900 includes selecting a latent state satisfying a selection criterion (e.g., H[t]=$\text{Argmax}_i$ (R[i, t])). Subsequently, as represented by block 9-10, the method 900 includes generating class label, O[t]=C[t, H[t]].

As represented by block 9-11, the method 900 includes determining whether or not there are additional time steps left to evaluate. If there are additional time steps left to evaluate ('Yes' path from block 9-11), the method circles back to the portion of the method represented by block 9-4. On the other hand, if there are no additional time steps left to evaluate ('No' path from block 9-11), as represented by block 9-12, the method 900 includes returning the most recently generated class label O[T] representing a preferred estimate for a one-phoneme output decision by the phonotactic post-processor.

The following is pseudo-code providing an implementation of the method 900:

ROdecode(P, E, T, Q, C, R, L) : H,O
Where,
    P; N x 1 array of prior probabilities $P(l_i, c_i = \text{target})$
    E; N x M array of emission probabilities: $P(c_i | l_i, c_i = \text{target})$

```
              T; N x N array of transition probabilities P(l_j^(t+1), c_j = targett+1 | l_i^(t), c_i = target^(t))
              Q; T x N array of LSTM posterior probabilities for the N best candidates at each time step t = 1 ... T
              C; T x N array of candidate labels corresponding the the top N posterior probabilities at each t = 1 ... T
              R; N x 1 set of rank-ordered states
              L; M x 1 set of labels corresponding to possible output classes
              H; T x 1 sequence of latent states producing the best candidate after rank ordered decoding
              O; T x 1 sequence of class labels corresponding to the latent states in H
              ind(x, y); function returning the position of element x in array y
Initialize:
  1    for each rank-ordered latent state r_i ∈ R | i = 1 ... N
  2        R[ i, 1 ] <= P[ i ] * E[ i, ind(C[ 1, i ], L)] ;initialize the rank-ordered state probabilities R
  3    end for
  4    Rtemp = [ ]
Decode:
  5    for each time t <= 2 ... T
  6        for each current candidate c_{i,t} in C[t,i] | i = 1 ... N
  7            for each previous ro-state r_j | j = 1 ... N do:
  8                Rtemp[ j ] <= R[ j, t-1 ] * T[ j, i ] * ( Q[ j, t ] / E[ i, ind(C[ t, i ], L) ] )
  9            end for
 10            R[ i, t ] = max_j (Rtemp)
 11        end for
 12        H[ t ] = Argmax_i (R[ i, t ]) ;
 13        O[ t ] = C[ t, H[ t ] ]
 14    end for
 15    end ROdecode
```

Figure 10:
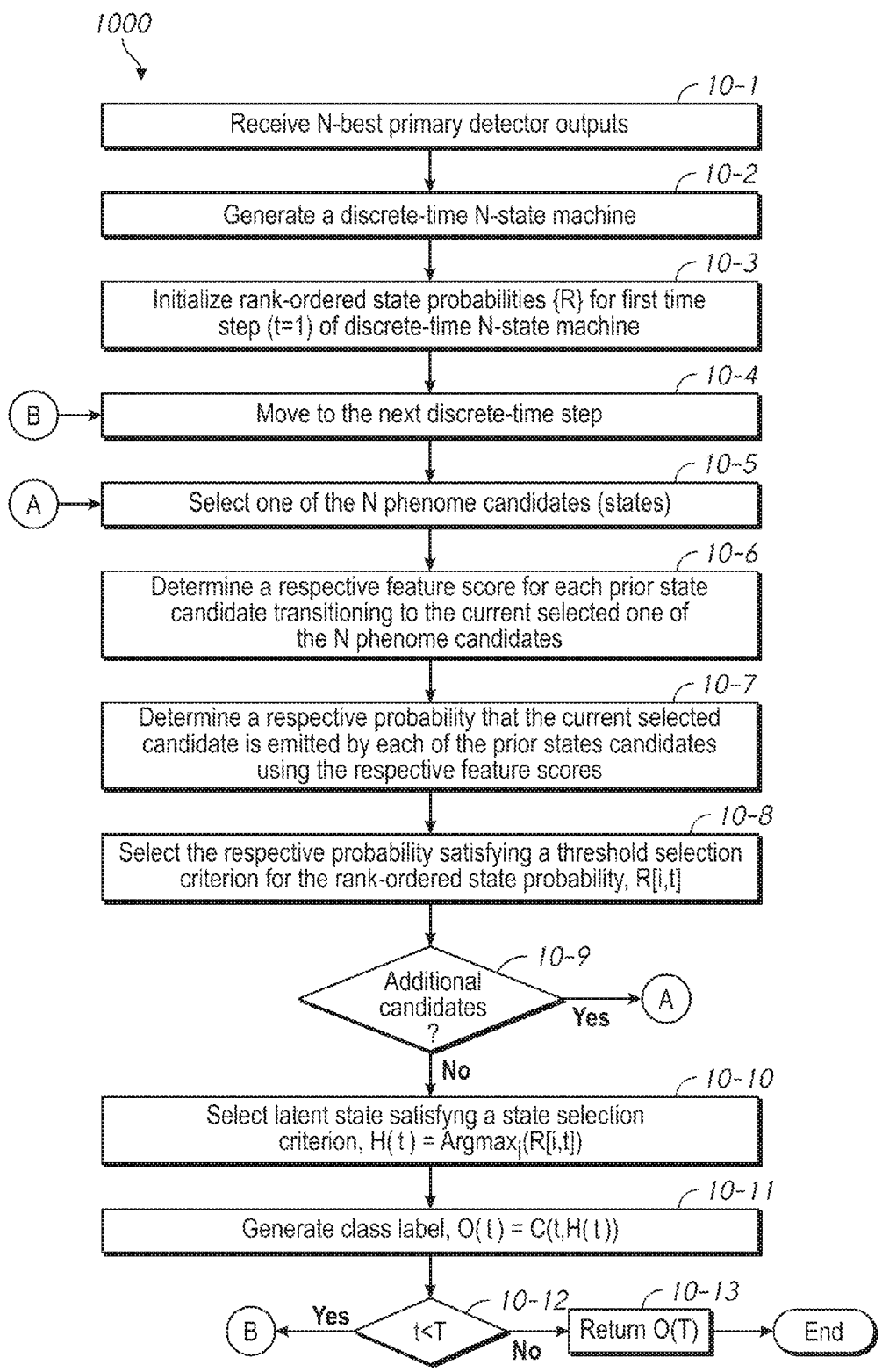
FIG. 10 is a flowchart representation of a method of rank-ordered decoding of N-best phoneme candidates in accordance with some implementations.

The method 900 can be further improved by integrating information about phonological feature sequences, as outlined above. To that end, FIG. 10 is a flowchart representation of a method 1000 of RO decoding that also information about phonological feature sequences according to some implementations. With additional reference to FIGS. 3 and 4, in some implementations the method 1000 is performed by the phoneme recognition system 1000, and in particular by the phonotactic post-processor 410. Where the method 900 is a straightforward application of a unique model using rank-ordered latent states, the method 1000 is instead a rescoring scheme based on a combination of rank-ordered decoding information and phonological feature information.

To that end, as represented by block 10-1, in some implementations the method 1000 includes receiving N-best primary detector outputs representing the phoneme candidates for a particular frame. For example, with reference to FIG. 3, the phonotactic post-processor 410 receives N-best (e.g., N=5 as in FIG. 7) outputs from the ensemble phoneme recognition neural network 310. As represented by block 10-2, in some implementations, the method 1000 includes generating a discrete-time N-state machine using the N-best primary detector outputs. For example, with reference to FIG. 3, the phonotactic post-processor 410 generates a discrete-time N-state machine using the N-best primary detector outputs.

As represented by block 10-3, the method 1000 includes generating RO state probabilities $\{R_1\}$ for the first time step of the discrete-time N-state machine. For example with reference to FIG. 7, RO state probabilities are generated for the five candidate states $cs_1$, $cs_2$, $cs_3$, $cs_4$, $cs_5$. As represented by block 10-4, the method 1000 includes moving to the next discrete-time step in the N-state machine. As represented by block 10-5, the method 1000 includes selecting one of the N-states (i.e., selecting one of the N phoneme candidates).

As represented by block 10-6, the method 1000 includes determining a respective feature score, $f$, for each prior state candidate transitioning to the current selected one of the N phoneme candidates. As represented by block 10-7, the method 1000 includes determining a respective probability (e.g., $\{R_{temp}[j,t]\}$ in the pseudo-code below) that the selected phoneme candidate is emitted by each of the prior N states in the N-state machine as a function of the respective feature score, $f$. As represented by block 10-8, the method 1000 includes selecting a respective probability, from the generated set $\{R_{temp}[j,t]\}$, that satisfies a threshold selection criterion (e.g., R[i, t]=max, (Rtemp)) for the RO state probability R[i,t].

As represented by block 10-9, the method 1000 includes determining whether or not there are additional phoneme candidates to evaluate. If there are additional phoneme candidates left to evaluate ('Yes' path from block 10-9), the method circles back to the portion of the method represented by block 10-5. On the other hand, if there are no additional phoneme candidates left to evaluate ('No' path from block 10-9), as represented by block 10-10, the method 1000 includes selecting a latent state satisfying a selection criterion (e.g., H[t]=Argmax_i (R[i,t])). Subsequently, as represented by block 10-11, the method 1000 includes generating class label, O[t]=C[t, H[t]].

As represented by block 10-12, the method 1000 includes determining whether or not there are additional time steps left to evaluate. If there are additional time steps left to evaluate ('Yes' path from block 10-12), the method circles back to the portion of the method represented by block 10-4. On the other hand, if there are no additional time steps left to evaluate ('No' path from block 10-12), as represented by block 10-13, the method 1000 includes returning the most recently generated class label O[T] representing a preferred estimate for a one-phoneme output decision by the phonotactic post-processor.

The following is pseudo-code providing an implementation of the method 1000:

```
PPPfeat(P, E, T, Q, C, R, L, phoneFeatureMatrix, featureProbTensor): H, O
Where,
       P; N x 1 array of prior probabilities P(l_i, c_i = target)
       E; N x M array of emission probabilities: P(c_i| l_i , c_i = target)
```

-continued

```
        T; N x N array of transition probabilities P(l_j^(t+1)), c_j = targett+1 | l_i^(t), c_i = target^(t)
        Q; T x N array of LSTM posterior probabilities for the N best candidates at each time step t = 1 ... T
        C; T x N array of candidate labels corresponding the the top N posterior probabilities at each t = 1 ... T
        R; N x 1 set of rank-ordered states
        L; M x 1 set of labels corresponding to possible output classes
        H; T x 1 sequence of latent states producing the best candidate after rank ordered decoding
        O; T x 1 sequence of class labels corresponding to the latent states in H
        ind(x, y); function returning the position of element x in array y
        phoneFeatureMatrix; the M x K phone feature matrix specifying encodings for the M classes in terms of K features
Initialize:
 1    for each rank-ordered latent state r_i ∈ R | i = 1 ... N
 2        R[ i, 1 ] <= P[ i ] * E[ i, ind(C[ 1, i ], L)] initialize the rank-ordered state probabilities R
 3    end for
 4    H[ 1 ] = Argmax_i (R[ i, t ]) ;
 5    O[ 1 ]=C[ t, H[ t ] ]
 6    Rtemp = [ ]
Choose:
 7    for each time t <= 2 ... T
 8        for each current candidate c_{i,t} in C[ t, i ] | i = 1 ... N
 9            for each previous candidate c_j in C[ t-1, j ] | j = 1 ... N do:
10                f = computeFeatureScore( C[ t-1, j ], C[ t, i ], phoneFeatureMatrix,featureProbTensor)
11                Rtemp[ j ] <= ( T[ j, i ] * ( Q[ j, t ] / E[ i, ind(C[ t, i ], L) ] ) ) / f
12            end for
13            R[ i, t ] = max_j (Btemp)
14        end for
15    H[ t ] = Argmax_i (R[ i, t ]) ;
16    O[ t ]=C[ t, H[ t ] ]
17    end for
18    return H, O
19    endPPPfeat
19    function computeFeatureScore(phone1, phone2, F, P) : f
Where,
        phone1; first phone in a biphone sequence
        phone2; second phone in a biphone sequence
        F; array containing phone feature matrix specifying feature encodings for all possible phoneme classes
        F is size K x K, where N is the number of features in the encoding
        P; 3-dimensional array containing feature n-gram probabilities
        ind(x, y); generic function returning the position of element x in array y.
        sum(x); returns sum of elements in array x
20    p1 <= ind(phone1, F) ; row position of phone1 in the phone feature matrix
21    p2 <= ind(phone2, F) ; row position of phone2 in the phone feature matrix
22    b <= binStates(idx1, idx2, F)
23    for I <= 1 ... K do:
24        ftemp[ i ] <= P[ p1, p2, ind(b[ i ], P) ]
25    end for
26    f = sum(ftemp) / K
27    return f
28    subfunction binStates(idx1, idx2, F)
29        for each attribute, return the ngram state sequences (e.g. {0-1} for a bigram)
30        for i <= 1 ... K do:
31            b[ i ] <= cat(F[ idx1, i ], F[ idx2, i]) ;retrieves encodings from the phone feature matrix
32        end for
33        return b
34    end binStates
35    end computeFeatureScore
```

Figure 11:
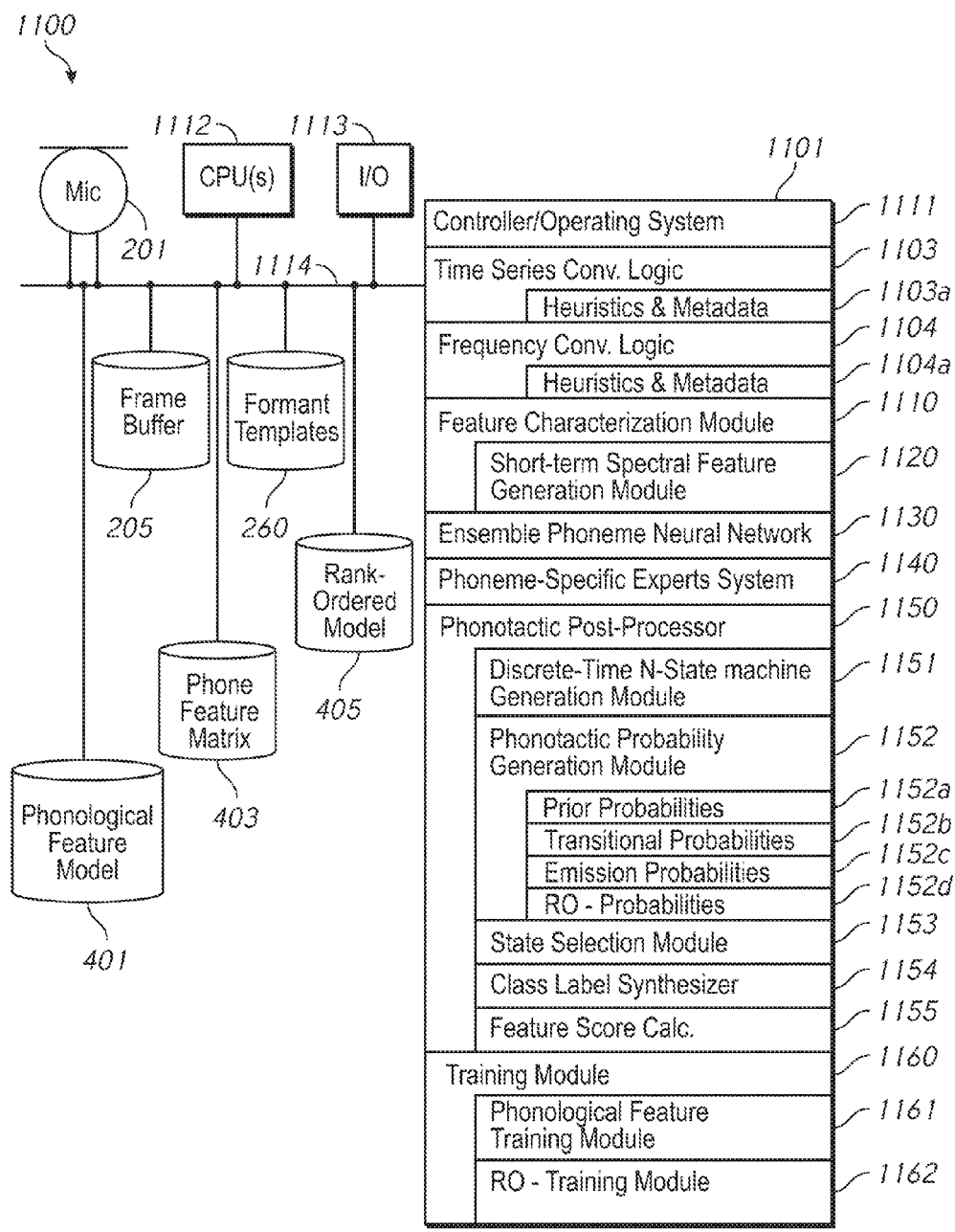
FIG. 11 is a schematic diagram of a system configured to identify and re-synthesize the speech of a particular speaker based utilizing phonotactic-knowledge through rank-ordered decoding of N-best phoneme candidates according to some implementations.

FIG. 11 is a schematic diagram of a system 1100 configured to identify and re-synthesize the speech of a particular speaker based utilizing phonotactic-knowledge through rank-ordered decoding according to some implementations. While pertinent features are illustrated, those skilled in the art will appreciate from the present disclosure that various other features have not been illustrated for the sake of brevity and so as not to obscure more pertinent aspects of the example implementations disclosed herein.

As a non-limiting example, in some implementations the system 1100 includes the microphone 201, non-transitory memory allocations for the phonological feature model 401, the phone feature matrix 403, and the rank-ordered (RO) model 405, the frame buffer 205, the formant templates buffer 260, one or more processing units (CPU's) 1112, one or more local I/O (input/output) interfaces 1113, an allocation of programmable logic and/or non-transitory memory (local storage) 1101, and one or more communication buses 1114 for interconnecting these and various other components not illustrated for the sake of brevity.

In some implementations, the communication buses 1114 include circuitry that interconnects and controls communications between the various components of the system 1100. In various implementations the programmable logic and/or non-transitory memory 1101 includes a suitable combination of a programmable gate array (such as an FPGA or the like), high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The programmable logic and/or non-transitory memory 1101 optionally includes one or more storage devices remotely located from the CPU(s) 1112. The programmable logic and/or non-transitory memory 1101 comprises a non-transitory computer readable storage medium. In some implementations, the programmable logic and/or non-transitory memory 1101 includes the following programs, modules and data structures, or a subset thereof including a programmable logic controller (and/or an optional operating system) 1111, time series conversion logic 1103, frequency domain conversion logic 1104, a feature characterization module 1110, an ensemble phoneme recognition neural network module 1130, a phoneme-specific experts system module 1140, a phonotactic post-processor module 1150, and a training module 1160.

The programmable logic controller 1111 includes implementations of functions and procedures for handling various system services and for performing hardware dependent tasks. In some implementations, the programmable logic controller 1111 includes some or all of an operating system executed by the CPU(s) 1112.

In some implementations, the times series conversion module 1103 is configured to generate two or more temporal frames of audible signal data from a continuous stream of audible signal data. Each temporal frame of audible signal data includes a temporal portion of the audible signal received by the microphone 201. In some implementations, the times series conversion module 1103 includes a windowing module that is configured to mark and separate one or more temporal frames or portions of the audible signal data for times $t_1, t_2, \ldots, t_n$. To that end, the times series conversion module 1103 includes heuristics and metadata 1103a.

In some implementations, the frequency domain conversion logic 1104 is configured to generate a corresponding frequency domain representation for each of the one or more temporal frames, so that one or more spectral characteristics of the audible signal data can be determined for each frame. In some implementations, the frequency domain representation of a temporal frame includes at least one of a plurality of sub-bands contiguously distributed throughout the frequency spectrum associated with voiced sound. To that end, the frequency domain conversion logic 1104 includes heuristics and metadata 1104a. In some implementations, for example, the frequency domain conversion logic 1104 includes a Fast Fourier Transform (FFT) sub-module. The frequency domain representations of the frames are stored in the frame buffer 205, which is accessible to the spectral feature characterization module 1110.

In some implementations, the feature characterization module 1110 is configured to generate a plurality of feature streams from frequency domain representations of the one or more frames of audible signal data. In various implementations, the plurality of feature streams generated by the feature characterization module 1110 includes a first feature stream ($F_1$) that is suitable for an ensemble phoneme recognition neural network. Additionally, in some implementations, the plurality of feature streams generated includes one or more targeted feature streams ($F_2$ to $F_n$) that are suitable for corresponding PPENNs. As described above, each problematic phoneme feature stream is provided to a corresponding PPENN that supports the operation of the ensemble phoneme recognition neural network.

In various implementations, the feature characterization module 1110 includes a short-term spectral feature generation module 1120. In various implementations, the short-term spectral feature generation module 1120 is configured to synthesize the plurality of feature streams ($F_1, F_2$ to $F_n$). Each of the plurality of feature streams ($F_1, F_2$ to $F_n$) includes any of a number and/or combination of signal processing features, such as spectra, cepstra, mel-scaled cepstra coefficients, power normalized cepstral coefficients, fundamental frequency ($f_0$), a signal-to-noise ratio (SNR), a voice strength estimate, and a voice period variance estimate.

In some implementations, the ensemble phoneme recognition neural network module 1130 is configured to recognize individual phonemes with respect to all other phonemes within audible signal data. The ensemble phoneme recognition neural network 1130 is configured to recognize individual phonemes with respect to all other phonemes in a sequence of audible signal data. The ensemble phoneme recognition neural network 1130 uses the spectral features included in the first feature stream ($F_1$) that was synthesized from the sequence of audible signal data obtained by the microphone 201. As noted above, for the majority of phonemes, the ensemble phoneme recognition neural network 1130 performs with a relatively high level of accuracy without support from the phoneme-specific experts system module 1140. In various implementations, the ensemble phoneme recognition neural network module 1130 is configured and provided to support the operation of the ensemble phoneme recognition neural network module 1140 in the process of recognizing problematic phonemes, which are difficult to detect and are frequently misidentified as other similar sounding phonemes.

In some implementations, the phonotactic post-processor module 1150 is configured to identify a one-phoneme output candidate in the N-best candidate list from the ensemble phoneme recognition neural network module 1130 (or the like). To that end, in various implementations, the phonotactic post-processor module 1150 includes a discrete-time N-state machine generation module 1151, a phonotactic probability generation module 1152, a state selection module 1153, a class label synthesize module 1154, and feature score calculation module 1155.

In some implementations, the discrete-time N-state machine generation module 1151 is configured to generate a discrete-time N-state machine using the N-best network training data or the N-best outputs of a primary detector. In some implementations, the phonotactic probability generation module 1152 is configured to generate probabilities associated with RO-decoding as described above with reference to FIGS. 8-10. To that end, in various implementations, the phonotactic probability generation module 1152 includes a prior probabilities generation module 1152a, a transitional probabilities generation module 1152b, an emission probabilities generation module 1152c, and a RO probabilities generation module 1152d. In some implementations, the state selection module 1153, is configured to select phoneme candidate states as described above with reference to FIGS. 9-10. In some implementations, the class label synthesize module 1154 is configured to synthesize class labels as described above with reference to FIGS. 9-10. In some implementations, the feature score calculation module 1155 is configured to calculate feature scores as described above with reference to FIG. 10.

In some implementations, the training module 1160 is configured to train the various portions of the phoneme recognition system 1100. As shown in FIG. 11, in various implementations, the training module 1160 includes a phonological feature training module 1161, and RO training module 1162.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first feature could be termed a second feature, and, similarly, a second feature could be termed a first feature, which changing the meaning of the description, so long as all occurrences of the "first feature" are renamed consistently and all occurrences of the "second feature" are renamed consistently. The first feature and the second feature are both features, but they are not the same feature.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A device configured to identify phonemes within audible signal data, the device comprising:
    an ensemble phoneme recognition neural network configured to assess which of a plurality of phonemes is present within audible signal data based on inputs including at least a first feature stream synthesized from the audible signal data, wherein the first feature stream includes a combination of spectral features enabling identification of each of a majority of the plurality of phonemes as distinct from the majority of the plurality of phonemes, and output N-best phoneme candidates for a respective analysis frame of the audible signal data, wherein each of the N-best phoneme candidates is characterized by a respective phoneme class label and a respective posterior probability; and
    a phonotactic post-processor configured to identify a one-phoneme output candidate of the N-best phoneme candidates output by the ensemble phoneme recognition neural network by rescoring the respective posterior probabilities characterizing the N-best phoneme candidates based on a rank-order decoding function.

2. The device of claim 1, wherein the ensemble phoneme recognition neural network is further configured to assess which of the plurality of phonemes is present within the audible signal data based on inputs also including one or more detection indicator values, wherein each of the one or more detection indicator values characterizes a respective probability that a corresponding problematic phoneme is present within the audible signal data based on one or more targeted feature streams.

3. The device of claim 2, further comprising a phoneme-specific experts system configured to generate the one or more detection indicator values from an input including a corresponding one or more targeted feature streams, wherein each of the one or more targeted feature streams is associated with a respective problematic phoneme.

4. The device of claim 2, further comprising a spectral feature characterization module configured to generate the one or more targeted feature streams.

5. The device of claim 4, wherein spectral feature characterization module includes a characterization engine configured to generate spectral feature values including one or more of spectra values, cepstra values, mel-scaled cepstra coefficients, power normalized cepstral coefficients, a pitch value, a signal-to-noise ratio (SNR), a voice strength estimate, and a voice period variance estimate.

6. The device of claim 4, wherein spectral feature characterization module includes an ensemble feature characterization sub-module that is configured to synthesize the first feature stream from the audible signal data.

7. The device of claim 4, wherein spectral feature characterization module includes a respective number of problematic phoneme feature characterization (PPFC) sub-modules, wherein each PPFC sub-module is configured to synthesize and provide a corresponding one of the one or more targeted feature streams to a phoneme-specific experts system.

8. The device of claim 3, wherein phoneme-specific experts system includes one or more problematic phoneme-specific expert neural networks (PPENNs), wherein each of the one or more PPENNs is associated with a particular problematic phoneme, and is configured to generate a respective one of the one or more detection indicator values based on a corresponding one of the one or more targeted feature streams.

9. The device of claim 1, wherein the rank-order decoding function comprises:
    generating a N-state machine based on the N-best phoneme candidates, wherein each of the N-best phoneme candidates defines an N-state of the N-state machine;
    determining a respective probability that a phoneme candidate is emitted by each prior N states in the N-state machine for a current time step; and
    selecting one of the respective probabilities that satisfies a threshold selection criterion for each one of the N-states for the current time step.

10. The device of claim 9, wherein the rank-order decoding function further comprises:
    selecting one of the N-states satisfying a state selection criterion as a most likely state, representing a respective one of the N-best phoneme candidates, for the current time step; and
    generating a phoneme class label associated with the selected one of the N-states.

11. The device of claim 9, wherein the rank-order decoding function further comprises:
    determining a respective feature score for each of the prior N states transitioning to one of the N-states in the current time step, and
    wherein determining the respective probability that a phoneme candidate is emitted by each of the prior N states in the N-state machine for the current time step is based on the respective feature score.

12. A method of identifying phonemes within audible signal data, the method comprising:
    generating, using an ensemble phoneme recognition neural network, N-best phoneme candidates for a respective analysis frame of the audible signal data, wherein the N-best phoneme candidates represent which of a plurality of phonemes is present within the audible signal data based on a first feature stream synthesized from the audible signal data, wherein the first feature stream includes a combination of spectral features enabling identification of each of a majority of the plurality of phonemes as distinct from the majority of the plurality of phonemes, wherein each of the N-best phoneme candidates is characterized by a respective phoneme class label and a respective posterior probability; and
    identify, using a phonotactic post-processor, a one-phoneme output candidate of the N-best phoneme candidates output by the ensemble phoneme recognition neural network by rescoring the respective posterior probabilities characterizing the N-best phoneme candidates based on rank-order decoding.

13. The method of claim 12, further comprising:
    synthesizing a plurality of features streams from the audible signal data, the plurality of feature streams including a first feature stream and one or more targeted feature streams, wherein each of the one or more targeted feature streams is associated with a respective problematic phoneme; and
    generating one or more detection indicator values using a phoneme-specific experts system, wherein generation of the one or more detection indicator values is correspondingly based on the one or more targeted feature streams, and wherein each of the one or more detection indicator values characterizes a respective probability that a corresponding problematic phoneme is present within the audible signal data.

14. The method of claim 13, wherein assessing which of the plurality of phonemes is present within the audible signal data includes generating one or more phoneme candidates as recognized within the audible signal data based on the first feature stream and the one or more detection indicator values.

15. The method of claim 13, wherein synthesizing each of the plurality of feature streams includes generating a combination of spectral feature values including one or more of spectra values, cepstra values, mel-scaled cepstra coefficients, power normalized cepstral coefficients, a pitch value, a signal-to-noise ratio (SNR), a voice strength estimate, and a voice period variance estimate.

16. The method of claim 13, wherein generating at least one of the one or more detection indicator values includes generating a confidence value characterizing an extent to which portions of the audible signal data satisfy a detection threshold associated with a particular problematic phoneme.

17. The method of claim 12, wherein the rank-order decoding comprises:
    generating a N-state machine based on the N-best phoneme candidates, wherein each of the N-best phoneme candidates defines an N-state of the N-state machine;
    determining a respective probability that a phoneme candidate is emitted by each prior N states in the N-state machine for a current time step; and
    selecting one of the respective probabilities that satisfies a threshold selection criterion for each one of the N-states for the current time step.

18. The method of claim 16, wherein the rank-order decoding further comprises:
    selecting one of the N-states satisfying a state selection criterion as a most likely state, representing a respective one of the N-best phoneme candidates, for the current time step; and
    generating a phoneme class label associated with the selected on of the N-states.

19. The method of claim 16, wherein the rank-order decoding further comprises:
    determining a respective feature score for each prior N states transitioning to one of an N state in the current time step, and
    wherein determining the respective probability that a phoneme candidate is emitted by each of the prior N states in the N-state machine for the current time step is based on the respective feature score.

* * * * *